(12) United States Patent
Ivanov et al.

(10) Patent No.: US 7,979,850 B2
(45) Date of Patent: *Jul. 12, 2011

(54) METHOD AND SYSTEM FOR GENERATING A COMMON TRACE DATA FORMAT

(75) Inventors: Ventsislav I. Ivanov, Sofia (BG); Hristo I. Dobtchev, Sofia (BG)

(73) Assignee: SAP AG, Walldorf (DE)

( * ) Notice: Subject to any disclaimer, the term of this patent is extended or adjusted under 35 U.S.C. 154(b) by 1049 days.

This patent is subject to a terminal disclaimer.

(21) Appl. No.: 11/529,980

(22) Filed: Sep. 29, 2006

(65) Prior Publication Data

US 2008/0127110 A1    May 29, 2008

(51) Int. Cl.
G06F 9/44    (2006.01)
(52) U.S. Cl. .......................................... 717/128; 714/45
(58) Field of Classification Search .................. 717/128; 714/45
See application file for complete search history.

(56) References Cited

U.S. PATENT DOCUMENTS

| | | | |
|---|---|---|---|
| 5,371,883 A | 12/1994 | Gross et al. | |
| 5,642,478 A * | 6/1997 | Chen et al. | 714/45 |
| 5,896,536 A * | 4/1999 | Lindsey | 717/128 |
| 6,202,199 B1 | 3/2001 | Wygodny et al. | |
| 6,526,371 B1 * | 2/2003 | Klein et al. | 702/186 |
| 6,678,883 B1 * | 1/2004 | Berry et al. | 717/128 |
| 6,708,173 B1 * | 3/2004 | Behr et al. | 1/1 |
| 6,802,054 B2 | 10/2004 | Faraj | |
| 7,003,781 B1 | 2/2006 | Blackwell et al. | |
| 7,140,025 B1 | 11/2006 | Dillow et al. | |
| 7,165,190 B1 * | 1/2007 | Srivastava et al. | 714/38 |
| 7,194,664 B1 | 3/2007 | Fung et al. | |
| 7,200,588 B1 * | 4/2007 | Srivastava et al. | 1/1 |
| 7,337,349 B2 | 2/2008 | Brauneis, Jr. et al. | |
| 7,380,239 B1 * | 5/2008 | Srivastava et al. | 717/128 |
| 7,392,505 B2 | 6/2008 | Ciapala et al. | |
| 7,640,459 B2 * | 12/2009 | Ivanov et al. | 714/45 |
| 2003/0009507 A1 | 1/2003 | Shum | |
| 2003/0061550 A1 | 3/2003 | Ng et al. | |
| 2003/0065764 A1 * | 4/2003 | Capers et al. | 709/224 |
| 2003/0088854 A1 * | 5/2003 | Wygodny et al. | 717/130 |
| 2003/0212928 A1 | 11/2003 | Srivastava et al. | |
| 2004/0010570 A1 | 1/2004 | Kaler et al. | |
| 2004/0117768 A1 | 6/2004 | Chang et al. | |
| 2004/0153881 A1 | 8/2004 | Arend | |
| 2004/0158819 A1 * | 8/2004 | Cuomo et al. | 717/128 |
| 2004/0194066 A1 * | 9/2004 | Frey et al. | 717/127 |
| 2004/0220947 A1 | 11/2004 | Aman et al. | |
| 2005/0060408 A1 | 3/2005 | McIntyre et al. | |

(Continued)

OTHER PUBLICATIONS

"Office Action for U.S. Appl. No. 11/540,028, mailed Mar. 26, 2010.", 29 pages.

(Continued)

Primary Examiner — Emerson C Puente
Assistant Examiner — Hiren Patel
(74) Attorney, Agent, or Firm — Blakely, Sokoloff, Taylor & Zafman LLP

(57) ABSTRACT

A method for generating a common trace data format is disclosed. In one embodiment, the method includes generating trace data at a provider, identifying a format of the trace data, comparing the format of the trace data with a common format to determine if the format is in compliance with the common format, and modifying the format to comply with the common format, if the format is not in compliance with the common format.

20 Claims, 17 Drawing Sheets

U.S. PATENT DOCUMENTS

| | | | |
|---|---|---|---|
| 2005/0091373 A1 | 4/2005 | Ciapala et al. | |
| 2005/0120341 A1 | 6/2005 | Blumenthal et al. | |
| 2005/0132337 A1* | 6/2005 | Wedel et al. | 717/128 |
| 2005/0283673 A1 | 12/2005 | Ode | |
| 2006/0015612 A1 | 1/2006 | Shimazaki et al. | |
| 2006/0085798 A1 | 4/2006 | Bendiksen et al. | |
| 2006/0229064 A1* | 10/2006 | Pitkamaki et al. | 455/414.3 |
| 2006/0288149 A1 | 12/2006 | La Vigne et al. | |
| 2007/0143795 A1* | 6/2007 | Tran | 725/46 |
| 2007/0260668 A1 | 11/2007 | Chen et al. | |
| 2008/0098358 A1* | 4/2008 | Shekov | 717/128 |
| 2008/0098359 A1* | 4/2008 | Ivanov et al. | 717/128 |
| 2008/0127108 A1* | 5/2008 | Ivanov et al. | 717/128 |
| 2008/0127110 A1* | 5/2008 | Ivanov et al. | 717/128 |
| 2008/0155348 A1* | 6/2008 | Ivanov et al. | 714/45 |
| 2008/0155349 A1* | 6/2008 | Ivanov et al. | 714/45 |
| 2008/0155350 A1* | 6/2008 | Ivanov et al. | 714/45 |

OTHER PUBLICATIONS

"Office action mailed Mar. 29, 2010 for U.S. Appl. No. 11/529,978.", 26 pages.

Borgeest, Rolf, et al., "A trace based performance evaluation tool for parallel real time systems", Nov. 2, 1994, 14 Pages.

Dufour, Bruno, et al., "J: A Tool for Dynamic Analysis of Java Programs", McGill University, Oct. 2003, 2 Pages.

Harkema, M, et al., "Performance Monitoring of Java Applications", University of Twente Netherlands, Jul. 2002, 14 Pages.

Turner, J D., et al., "Application Response Measurement of Distributed Web Services", *IBM TJ Watson Research Center*, 2002, 12 Pages.

Non-Final Office Action for U.S. Appl. No. 11/540,348 Mailed Jan. 22, 2010, 18 Pages.

Non-Final Office Action for U.S. Appl. No. 11/541,119 Mailed Feb. 4, 2010, 19 Pages.

Non-Final Office Action for U.S. Appl. No. 11/540,028, Mailed Mar. 26, 2010, 29 Pages.

Non-Final Office Action for U.S. Appl. No. 11/529,978, Mailed Mar. 29, 2010, 26 Pages.

Final Office Action for U.S. Appl. No. 11/540,348 Mailed Jun. 23, 2010, 15 Pages.

Final Office Action for U.S. Appl. No. 11/540,028, Mailed Jul. 30, 2010, 16 Pages.

Final Office Action for U.S. Appl. No. 11/541,119 Mailed Aug. 2, 2010, 16 Pages.

Final Office Action for U.S. Appl. No. 11/529,978, Mailed Aug. 3, 2010, 16 Pages.

* cited by examiner

|  | Origin | Module | Action | Thread | Provider | Layer | StartTime | EndTime | Parent ID |
|---|---|---|---|---|---|---|---|---|---|
| SQL (J2EE) | * | + | + | + | p | + | + | c | n/a |
| JARM | * | n/a | n/a | n/a | p |  | + | c | n/a |
| HTTP Analyzer | * | n/a | n/a | n/a | p |  | + |  |  |
| IS Transaction Trace | * | + | + | n/a | p |  | + | + | + |
| SATATTARCE | * | + | + | + | p |  | + | + | n/a |
| RFC | * | + | + | n/a | p |  | + | c | n/a |
| SQL (ABAP) | * | + | + | n/a | p |  | + | c | n/a |

Legend:  \* - Provided by importer (host + SID)
p - Provided by importer (convector from trace) (type of trace, SQL, JARM ...)
c - Can be calculated from other fields from record
n/a - Not Available

| Name | Values | Description |
|---|---|---|
| Name | String | |
| Data Type | Integer | |
| Sematic Type | Integer | |
| Value | Complex Double\|Long\|String | |

- 1140 → Name
- 1142 → Data Type
- 1144 → Sematic Type
- 1146 → Value
- 1134 Name, 1136 Values, 1138 Description

FIG. 11C

| Semantics | Type | Example | Aggregates |
|---|---|---|---|
| Counter | Long, Double | Allocated Memory | sum |
| Guage | Long, Double | CPU utilization (%) | min, max, average |
| Guage | Long, Double | CPU utilization (%) | sum, min, max, average, net |
| Numeric ID | Long, Double | Error code | - |
| String | String | Message | - |

- 1148 Semantics, 1150 Type, 1152 Example, 1154 Aggregates
- 1156 Counter, 1158 Guage, 1160 Guage, 1162 Numeric ID, 1164 String

FIG. 11D

| Name | Values | Description |
|---|---|---|
| Type | Integer | |
| Flags | Integer | |
| Value | byte[512] | |

- 1166 Name, 1168 Values, 1170 Description
- 1172 Type, 1176 Flags, 1176 Value

METHOD AND SYSTEM FOR GENERATING A COMMON TRACE DATA FORMAT

FIELD

Embodiments of the invention generally relate to the field of tracing. More particularly, the embodiments of the invention relate to generating a common trace data format.

BACKGROUND

As application development projects are growing larger, tracing is becoming increasingly important. Tracing can be a very useful tool used primarily by software developers to isolate problems, for example, by tracking execution of program code. For example, when developing an application, developers trace the execution of methods or functions within certain modules to identify problems and/or to determine if the program code may be improved. If a particular method takes an inordinate amount of time to complete, the developer may determine the reasons why and/or change the program code to operate more efficiently.

Trace tools are proprietary application programs which use different techniques to trace the execution flows for an executing program. One technique, referred to as event-based profiling, tracks particular sequences of instructions by recording application-generated events as they occur. By way of example, a trace tool may record each entry into, and each exit from, a module, subroutine, function, method, or system component within a trace file (e.g., a time-stamped entry may be recorded within the trace file for each such event). Trace events may also be sent to a console or other output destination.

Conventional trace tools, however, are limited with tracing data from various systems, i.e., when dealing with tracing data of various structures. For example, conventional trace tools do not provide for integration of various trace files of different structures relating to different corresponding systems. This often leads to, at best, delay in reading of errors as the data has to be manually read and, at worst, misreading of errors or even loss of trace data. Tracing is particularly cumbersome when a development project involves a great number of systems, applications, components, modules, developers, and/or multiple interfaces and services.

SUMMARY

According to one embodiment, a method for generating a common trace data format is disclosed. The method includes generating trace data at a provider, identifying a format of the trace data, comparing the format of the trace data with a common format to determine if the format is in compliance with the common format, and modifying the format to comply with the common format, if the format is not in compliance with the common format.

Other embodiments are also disclosed. Further, the above attributes may be implemented using a computer program, a system, or an apparatus, or any combination thereof. These and other details of one or more embodiments of the present invention are set forth in the accompanying drawings and in the description below.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

FIGS. 11A-D illustrate embodiments of trace data formats.

DETAILED DESCRIPTION

As used herein, references to one or more "embodiments" are understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, including a description of the figures, which may depict some or all of the embodiments described below, as well as discussing other potential embodiments or implementations of the inventive concepts presented herein.

Figure 1:
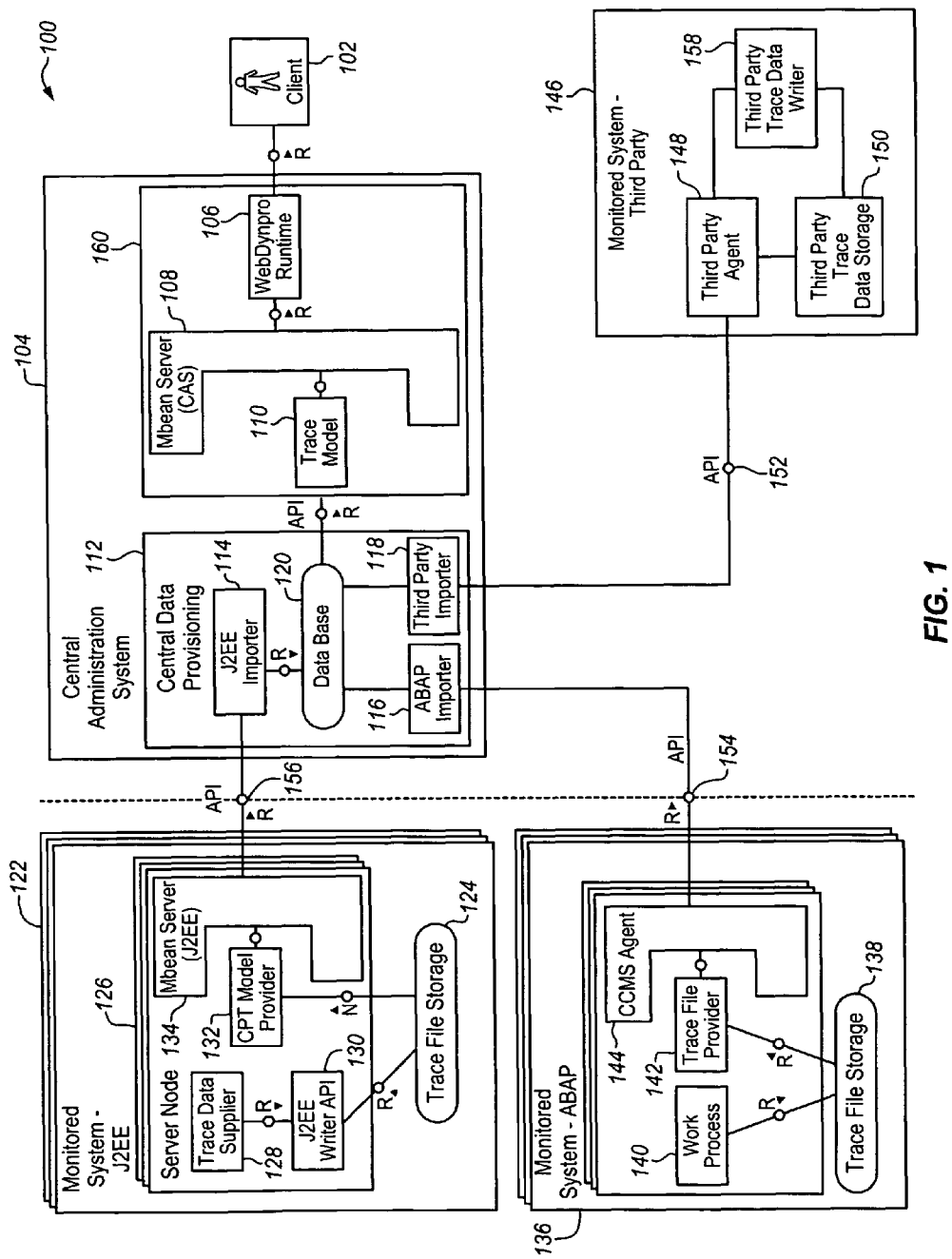
FIG. 1 illustrates an embodiment of a common performance trace architecture.

FIG. 1 illustrates an embodiment of a common performance trace architecture 100. In one embodiment, central administration system (CAS) 104 is employed coupled with monitored systems 122, 136, 146, such as a Java 2 Enterprise Edition (J2EE) system 122, an ABAP system 136, and a third party system 146 via various application programming interfaces (APIs) 152-156. In one embodiment, APIs 152-156 include common performance trace (CPT) APIs. It is contemplated that any number and type of monitored systems may be coupled with CAS 104. CAS 104 receives trace data from various monitored systems 122, 136, 146 and collectively provides the trace data in a common structure or format (e.g., CPT format) at database 120. Having a common structure or format for trace data allows the user to choose the data provider or monitored system 122, 136, 146 that meets the requirements or needs in light of changes to one or more applications, program codes, etc. A CPT format includes a format for common performance trace events that unifies different types, structures, and formats of performance data, such as the ones obtained from a structure query language (SQL) trace, a J2EE server performance trace (e.g., from a J2EE system 122, a ABAP server performance trace (e.g., from an ABAP system 136), and the like (e.g., from a third party system 146).

In one embodiment, CPT architecture 200 provides a mechanism for persisting and analyzing performance traces from various monitored systems 122, 136, 146. A performance trace refers to a special trace type that deals with performance issues of applications and program codes, such as like call durations, call stacks, memory consumption, amount of transferred data, and the like. CPT architecture 200 may consist of common data format, trace data providers, central analysis services, generic reports, and the like. CPT architecture 200 further provides a library that provides one or more APIs (e.g., CPT API) to give access to CPT files and database 120. A CPT API refers to an interface that allows for generation and persistence of performance trace data, which complies with the CPT format that is provided via CAS 104 and stored at CPT database 120, and manages various CPT processes as discussed elsewhere in this document. In one embodiment, a trace correlator is employed at CAS 104. A trace correlator includes an object that is used to analyze trace records, which are obtained from different, software components, physical locations (e.g., hosts) and at different times. A trace correlator helps define a semantic group, which is useful to understand how various traces belong together. Also, distributed statistics may be used that refer to a minimum performance trace, which continuously runs with a running system, such as monitored systems 122, 136, 146. It may be aggregated offline to statistical aggregates and analyzed with respect to performance, accounting, hardware sizing, system usage profiles, and the like.

CAS 104 is in communication with client 102. CAS 104 includes Mbean server 105 that is registered with CAS 104. Further, display application or user interface (UI) 106 (e.g., WebDynPro Runtime) is employed. In one embodiment, a program code is instrumented that creates trace data supplier to write performance trace data via CPT API 152-156 to database 120. Trace model 110 that is in communication with Mbean server 108 and database 120 allows accessing of trace data at database 120 via UI 106 by providing a merged trace data received from multiple monitored systems 122, 136, 146 via corresponding trace data importers 114-118 located at central data provisioning 112. Trace model 110 also provides for filtering and aggregation of trace data. To allow for proper access and analysis of trace data originating from multiple sources 112, 136, 146, the trace data is converted into a common format or structure (e.g., CPT format, CPT structure, etc.) and provided to the user via client 102 further via UI 106.

Various modules and components are employed at monitored systems 122, 136, 146 to facilitate tracing and for collection, processing, and exporting of trace data. For example, J2EE monitored system 122 includes trace file storage 124 and server node 126, which includes trace data supplier 128, model provider 132, writer API 130, and Mbean server 134. In one embodiment, model provider 132 is implemented as MBean registered to the local system MBean server 134 and allows the accessing of trace data from CAS 104. Trace file storage 124 is referred to as a CPT file that serves as a temporary storage for trace data at monitored system 122. Trace data supplier 128 is a source of trace data, while write API provides a CPT API for trace data writing and serves as a CPT tracer.

ABAP monitored system 136 include a CCMS agent 144 that allows CCMS to access trace data for the local ABAP system 136. The trace data is provided to CCMS agent 144 via trace file provider 142 and stored at trace file storage 138 and received using work process 140. The trace data is retrieved from ABAP monitored system 136 and exported to CAS 104 by performing RFC calls to CCMS via CCMS agent 144. The trace data is imported at CAS 104 via ABAP CCMS importer 116 and then stored at database 120. In one embodiment, a number of systems can be monitored and trace data from such systems may be provided to CAS 104 so that it can then be converted into and provided as a common CPT structure trace data for access and analysis by client 102. For example, a third party monitored system 146 is illustrated that includes various third party compatible functional modules and components to collect trace data and provide it to CAS 104. Such modules may include a third party trace data writer 158, a third party agent 148, and a third party trace storage 150 to perform their respective functions as with modules and components at other monitored systems 122, 136. Further, a third party importer 118 at CAS 104 is employed to import trace data from the third party monitored system 146.

In one embodiment, CPT architecture 100 provides a CPT format and correlation. The CPT format is CIM-compliant and provides a common format to perform traces to (1) define the type of data that is needed to analyze performance and/or functional problems, (2) allow for common central storage of trace data at database 120, which provides a common mechanism for persistence, management, and analysis, and (3) provide for correlation. Correlation allows for grouping (e.g., correlating) of trace records that belong to a single logical transaction by introducing a correlation, which is an abstract object. CPT architecture 100 further provides for selective and centralized switch of tracing data for involved components and traces types and structures. In one embodiment, the CPT reports of trace data may be implemented using UI application framework 106, such as the WebDynpro framework. The trace data is stored at database 120 using trace model 110 implemented as Mbean and registered with Mbean server 108 of CAS 104. Trace model 110 provides trace data both as race trace records and aggregated data.

In one embodiment, a user activity triggers requests that are processed by various components at monitored systems 122, 136, 146 and CAS 104. For example, a web request from client 102 is sent to a J2EE application server associated with J2EE monitored system 136. Similarly a request may be sent to other system, such as ABAP system 136 and any other third party system 146. Components at various systems 122, 136, 146 produce different traces appropriate for analyzing several functional and performance problems. Abstract correlator objects are introduced to allow end-to-end analysis of applications and user activities that are processed by components running at various systems 122, 136, 146. Such correlator objects provide for combining performance and trace data from different origins, such as different system 122, 136, 146, (2) serializing the trace data over a network and transferring the trace data to CAS 104 via the metadata of various communication protocols, and (3) providing the trace data via a common structure to provide performance activities of applications, program codes, and user activities that are being monitored and analyzed.

Figure 2A:
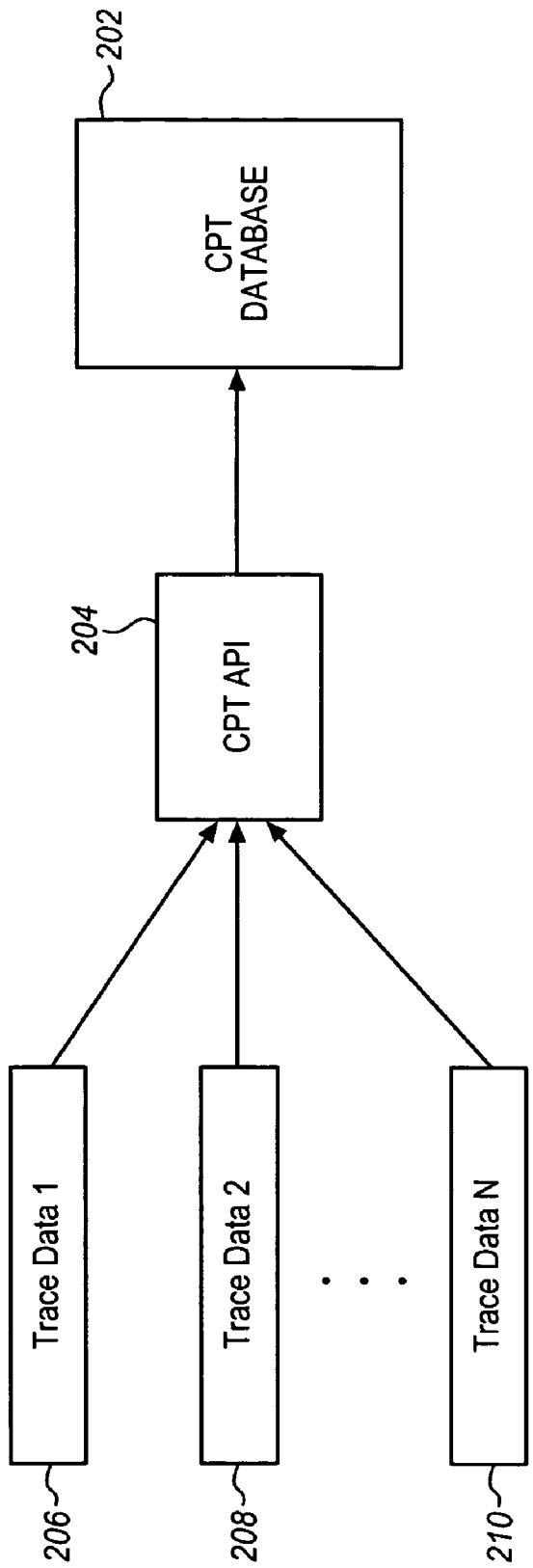
FIG. 2A illustrates an embodiment of a common performance test application programming interface.

FIG. 2A illustrates an embodiment of a common performance test application programming interface 204. In one embodiment, trace data 206-210 is collected from various trace data sources or providers (e.g., systems 122, 136, 146 of FIG. 1) and then provided to CPT database (e.g., database 120 of FIG. 1) at central administration system (e.g., CAS 104 of FIG. 1) via CPT API 204. CPT API may be associated with any number of modules and components, such as importers, writers, etc., to provide a way for trace data 206-210 to be provided at CPT database 202. CPT includes two development components: (1) a core library and (2) a service. The core library exposes CPT API 204 that allows instrumentation for writing performance traces by various components. The service is to configure CPT API 204 and view the gathered performance data.

CPT API 204 enables the currently existing functionalities in tracing (e.g., SQLTrace). Such functionalities include (1) reading trace data in an appropriate format for the corresponding application (e.g., OpenSQLMonitors application), (2) writing a trace record (together with metrics) is an atomic operation, (3) allowing the writing of trace data to a non database storage, and allowing the writing of trace data at server startup. Objects associated with CPT API 204 that are used for direct instrumentation of a trace data provider include (1) a factory object (e.g., CPTFactory) that is responsible for generating CPT provider objects via configuration, (2) a provider object (e.g., CPTProvider) which is used by the instrumented code to provide a lookup layer, action and metric definition objects that are defined in the configuration, (3) a record object (e.g., CPTRecord) that is used as a main entity to be persisted via CPT API 204. Record objects contain performance information for measured action.

Each trace record that is received from various providers (e.g., monitored systems) is then configured to a common structure (e.g., CPT structure) and is stored at database 202. A CPT trace record may contain any number of metrics. Such metrics are valued from the instrumented code at data providers (e.g., monitored systems) and are assigned to the CPT trace record by calling a particular API method, such as an API addMetric() method. If necessary, an CPT trace record may be extended. CPT configuration may be separated in two parts: static configuration and dynamic (online) configuration. The two configurations may be regarded as two different use cases. A static configuration file may be part of CPT API 204 and used for such initialization of CPT API 204 so it can be directly used by the data providers by having the static configuration contain default CPT writer settings. Static configuration is also used to predefine certain objects, such as application layers, system layers, and database layers, etc. Also, the static configuration defines certain general metric definitions, such as elapsed time, central processing unit (CPU) time, and memory allocation that are relevant for various types of performance traces. A dynamic configuration file is part of the component that provides performance trace data. The dynamic configuration file may contain provider specific configurations, like actions and metric definitions.

In one embodiment, CPT API 204 is initialized by a J2EE engine service where the currently existing performance trace service is to be extended with various functionalities. The performance trace service provides various correlators, such as a measurement correlator that is regarded as the main correlator and is used to group up trace records belonging to a certain measurement or trace. The measurement correlator is referred to as the parent correlator to other correlators that are additionally provided. Another correlator includes a J2EE Engine runtime info correlator that contains information about the corresponding J2EE Engine user/session/application. The origin of CPT trace records is at a monitored system, such as at a node of a J2EE server associated with a J2EE system. To achieve a writing performance trace at server startup, a default correlator is employed for each virtual machine (VM). Default correlators may not contain any data relating to the monitored system. Further, for each trace data provider or monitored system, a default layer may be defined. The default layer is then automatically assigned to CPT trace records belonging to the corresponding trace data provider.

Figure 2B:
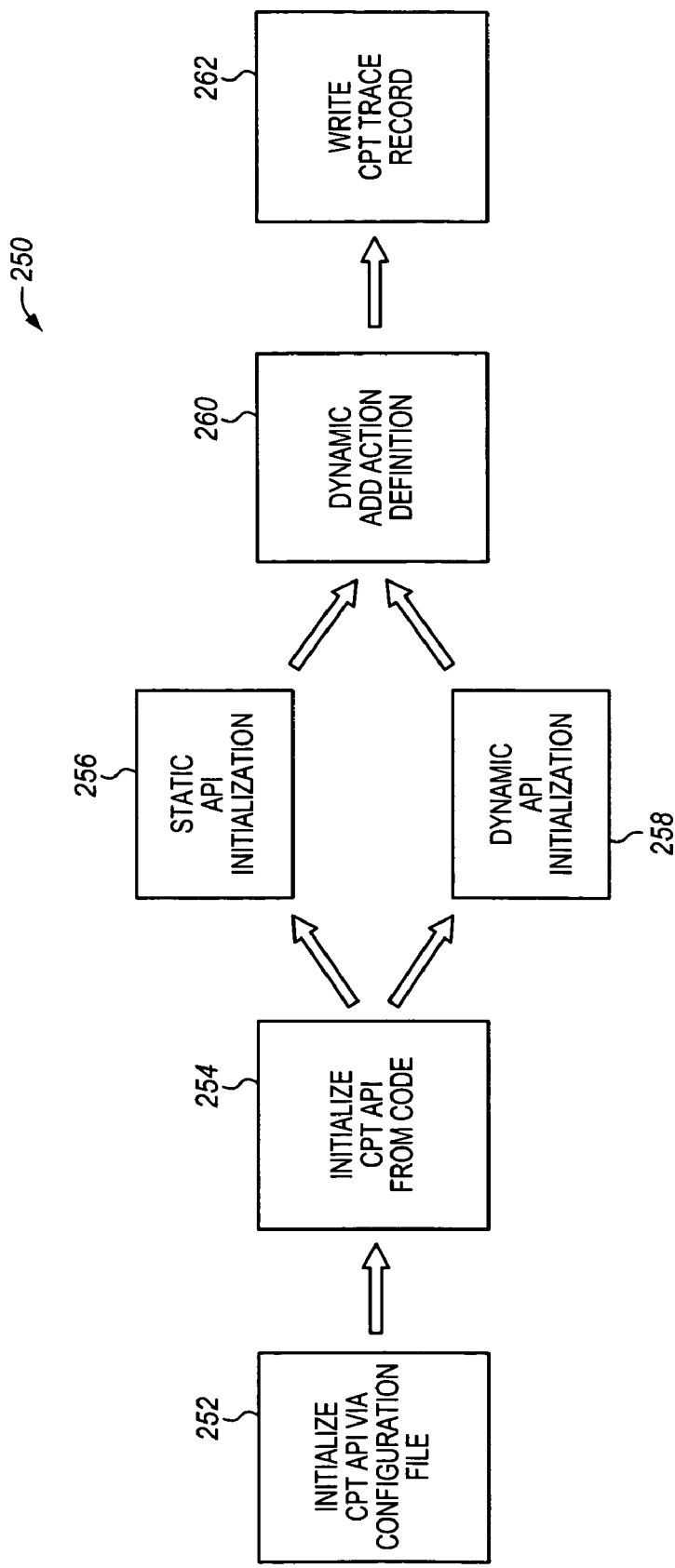
FIG. 2B illustrates an embodiment of a mechanism for using a common performance test application programming interface.

FIG. 2B illustrates an embodiment of a mechanism 250 for using a common performance test application programming interface. In one embodiment, CPT API is initialized 252 via a configuration file. The configuration file defines a provider that writes trace data in file storage. The configuration file further creates metric definitions of types, such as string, long, and double. CPT API is further initialized using a program code 254. CPT API allows the defining of a trace data provider using Extensible Markup Language (XML) configuration file or dynamically in the code. The CPT API initialization includes two types initializations: a static API initialization 256 and a dynamic API initialization 258. Various modules, components, and actions are defined dynamically defined 260 using a program code. An action may be for creating a CPT trace record. Then, a CPT trace record is written 262.

Figure 3:
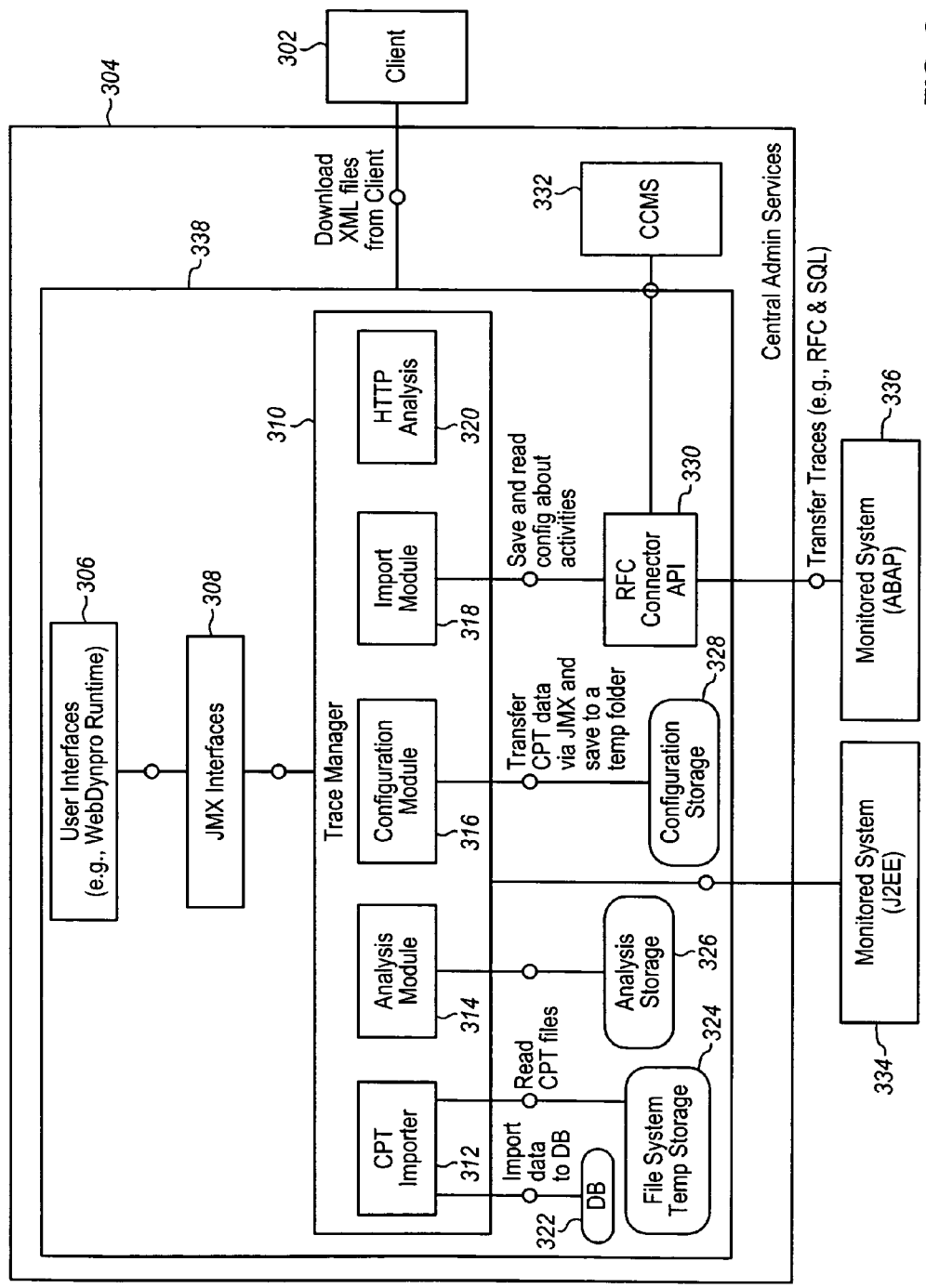
FIG. 3 illustrates an embodiment of a common performance trace architecture having a central administration system.

FIG. 3 illustrates an embodiment of a common performance trace architecture 300 having a central administration system 304. In one embodiment, CAS 304 is coupled to client 302 and systems that are being monitored for and are providers of trace data, such as J2EE monitored system 334 and ABAP monitored system 336. J2EE and ABAP system 334, 336 are coupled with CAS 304 via trace manager 310 that resides at CAS 304. Trace manager 310 is used to perform collection and analysis of trace data. Trace manager 310 is coupled to a UI 306 via Java Management Extensions (JMX) interfaces. Client 302 accesses trace information at trace manager 310 via a display application exposed via UI 306. For example, various XML files may be downloaded from client 302.

In one embodiment, trace data from J2EE and ABAP systems 334, 336 is imported at CAS 304 via various module and components, such as a CPT API and importers (e.g., CPT importer 312, import module 318, etc.). CPT importer 312 is used to import data from J2EE monitored system 334 and place it at database 322. The files having the trace data are first saved at file system 324 before being imported into database 322. Import module 318 may be used to import trace data from ABAP monitored system 336 and from any other system (such as the third party monitored system 146 of FIG. 1) and place it at database 322. For each ABAP trace, a reader class may be generated to be used to form an importer API of the CPT library. ABAP system 336 is in communication with trace manager 310 via RFC connecter API 330. RFC connecter API 330 serves as a proxy of RFC function modules and creates a general framework for connection to ABAP system 336. In addition to having and communicating with an ABAP system 336, a CCMS system 332 may also be added to CAS 304.

CAS 304 further includes configuration module 316 that contains methods for starting and stopping various trace activities, and for keeping general information (e.g., name, start data, end data, filters, etc.) about such activities. Configuration module 316 is in communication with configuration storage 328 where configuration data is stored. When a HyerText Transfer Protocol (HTTP) proxy is used on the client side, several XML files are generated as a result of that. These files are then uploaded to CAS 304 and with the help of a file (e.g., responses.trc file) that is generated by an HTTP service. Such HTTP analysis are generated and imported to CAS 304 via HTTP analysis module 320. Once trace activities are stopped and trace data form such activities are collected from monitored systems 334, 336 and imported into database 322, the trace data may then be kept at analysis storage 326 and analyzed by analysis module 314.

Figure 4:
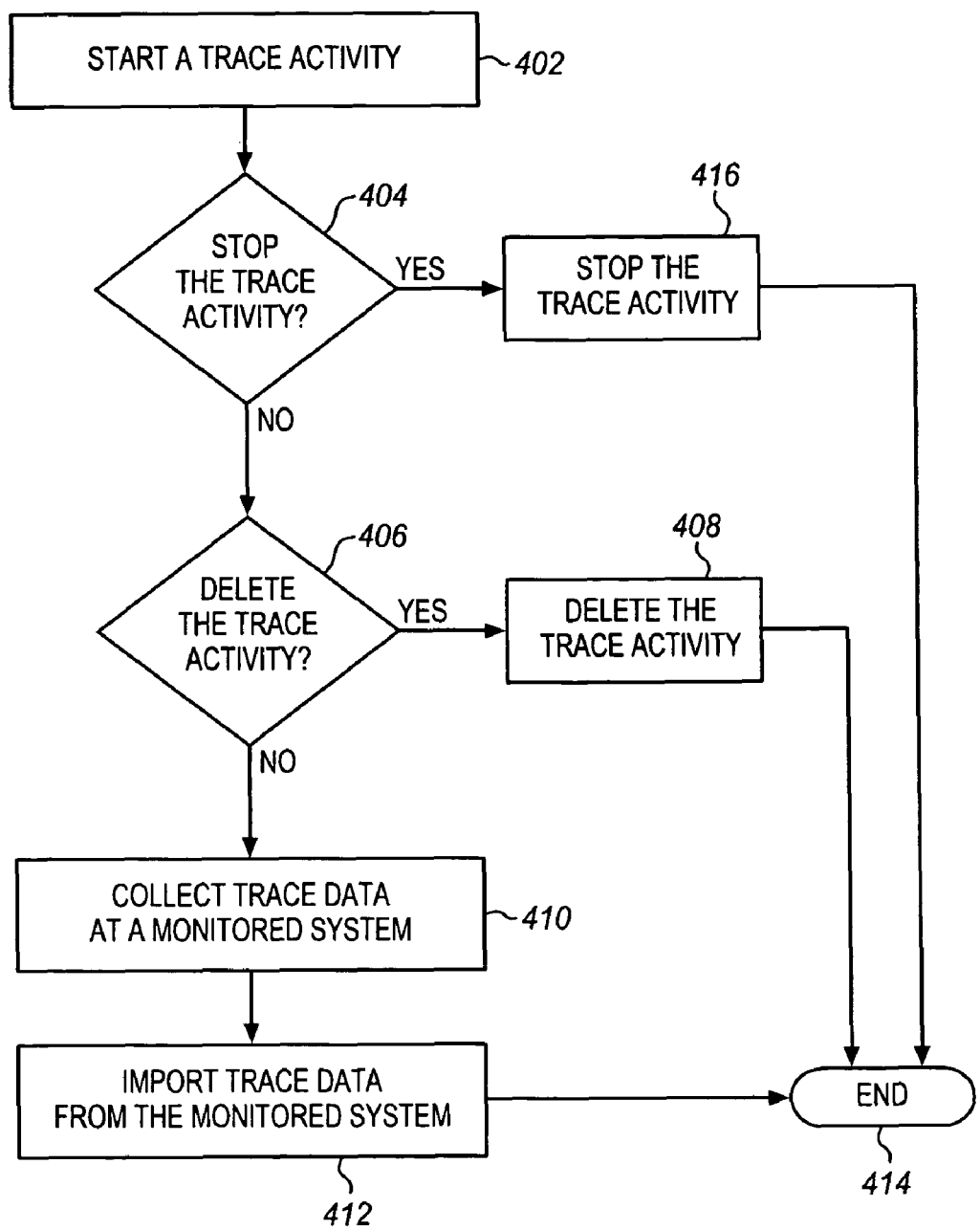
FIG. 4 illustrates an embodiment of a process for tracing and importing trace data.

FIG. 4 illustrates an embodiment of a process for tracing and importing trace data. At processing block 402, a trace activity is started such that program codes or applications at a system (e.g., J2EE system, ABAP system, etc.) can be monitored for trace data. It is contemplated that multiple trace activities may be started at multiple corresponding systems. In one embodiment, a user (e.g., administrator, developer, etc.) may select to start or generate the trace activity using system selection via a Web administration UI. For example, a Uniform Resource Locator (URL) is selected by the user at an Internet browser (e.g., Microsoft Explorer®, Netscape Navigator®) at a system. The user triggers the trace activity which then starts at a corresponding monitored system. At decision block 404, whether the trace activity is to be stopped is determined. If the trace activity is to be stopped, it is stopped at processing block 404 and the process ends at termination block 414. This can be triggered by the user via the UI. In case of multiple trace activities, the user may select to stop one or more trace activities, but not all of them. For example, the user my select to end the trace activity at a J2EE system, but continue with the ABAP and other systems. If the trace activity is not to be stopped, it continues with decision block 406.

At decision block 406, a determination is made as to whether the trace activity is to be deleted. If for any reason (e.g., incorrect application being traced, tracing data is correct, etc.), the trace activity at any given system is to be deleted at processing block 408, it is deleted and the process ends at termination block 414. This is can be accomplished by the user via the UI. In case of multiple trace activities, it is contemplated that one or more trace activities may be deleted, while still performing one or more other trace activities. If the trace activity is not to be deleted, the processing continues with collecting of trace data at the monitored system at processing block 410. When multiple trace activities are performed at multiple monitored systems, the trace data collected from each of those monitored systems may be of format and structure. For example, J2EE traces may be different in structure from ABAP traces. At processing block 412, the trace data is imported to a central database that provides a common structure of all trace data. The trace data having different structures is imported and converted into a common structure for the user to access and analyze at the central CPT database. This import may be performed via a number of CPT APIs, importers, import modules, temporary storages, and other modules and components. The process ends at processing block 414.

Figure 5:
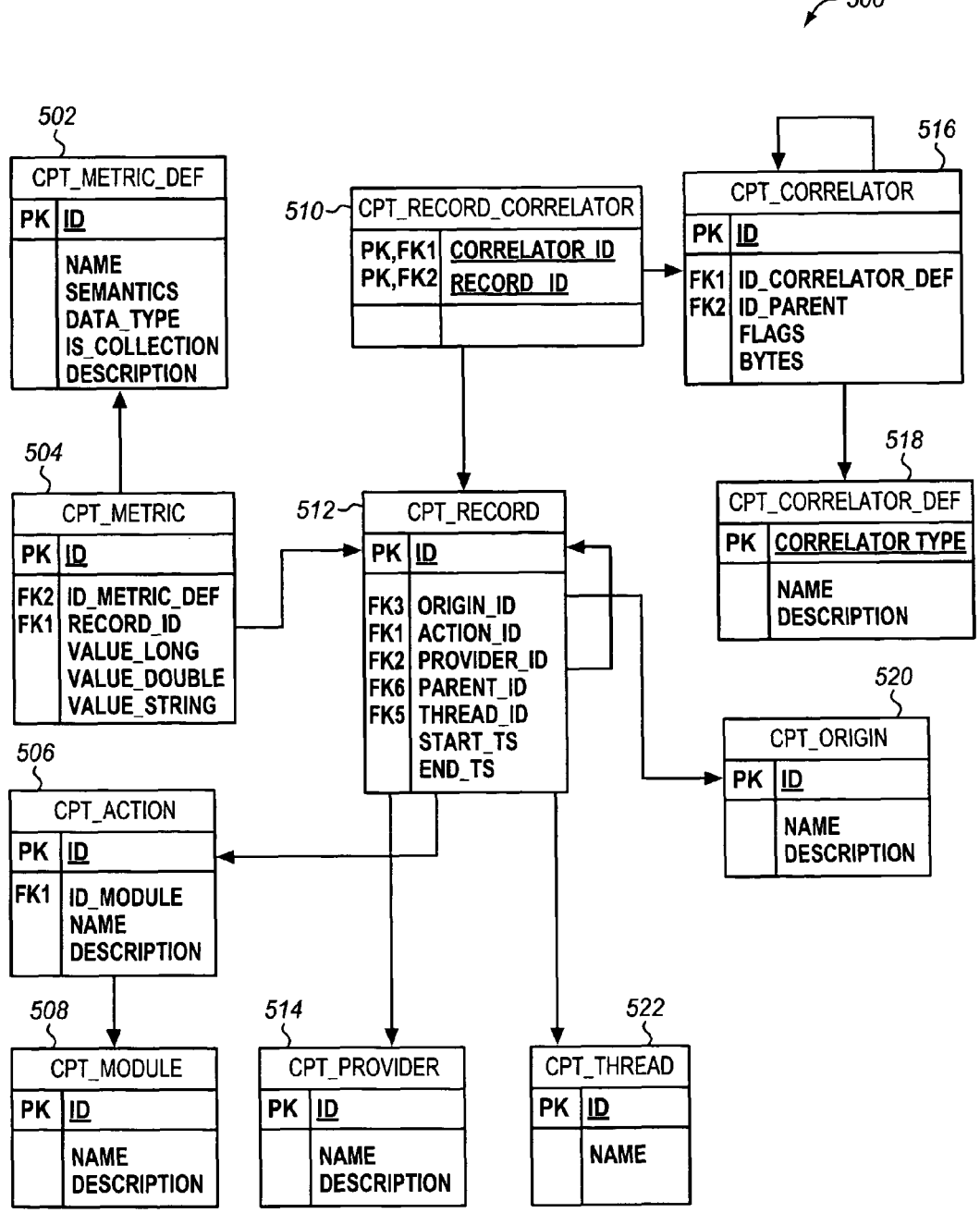
FIG. 5 illustrates an embodiment of a trace data structure represented at a common performance trace database.

FIG. 5 illustrates an embodiment of a trace data structure 500 represented at a common performance trace database. In one embodiment, a CPT API is used to store and manipulate trace data, including converting trace data of various formats and structures obtained from various monitored system into a common format/structure to be provided via a central CPT database. Once the import and conversion of trace data is performed from various systems to the CAS, the trace data is stored at the CPT database and represented in a special way such that the trace data is easily retrieved and manipulated. In one embodiment, the CPT mechanism uses two types of storage systems. The first type of storage system includes a file storage that is used to store CPT trace during execution of certain functionalities (e.g., to record processes in execution, etc.). The other type of storage system includes a database storage (e.g., central CPT database) that is capable of being used for manipulating trace data (e.g., to retrieve specific records, to retrieve records with specified correlation or specified provider, etc.).

In the illustrated embodiment, the database storage of trace data is shown as having various modules, records, etc. For example, a CPT-compatible trace data format or structure contains a stream of six files, such as (1) file origins, (2) file metrics, (3) file correlators, (4) file metadata, (5) file record correlator, and (6) file records. Each of the elements 502-520 illustrated here are contained in one or more such streams of files. For example, CPT metric definition 502, which contains unique identification, may be contained in file metrics, but repeated in file origins. CPT origin 520 includes a node from where a record (e.g., CPT record 512) originates. CPT origin is found in file metadata and when combined with the unique identification from CPT metric definition 502 provides a global identification for the record 512. CPT module 508 provides the name of the logical unit (e.g., class name) corresponding to the record originated. CPT module 508 is contained in file metadata. CPT action 506, which is in communication with CPT module 508, provides the name (e.g., method name) of a module subsection which measures execution time.

CPT thread 522 provides a unique identification of the thread executing the module. CPT thread 522 is located in file metadata. CPT provider 514 is a provider of the record 512 and is contained in file metadata. Examples of trace data handled by a CPT provider 514 include SATrace, SQLTrace, APPTrace, etc. The providers, for example, may include SATrace, SQLTrace, APPTrace, etc. Based on the provider name, the visualizer can use plug-ins for additional processing. CPT record 512 includes the record that is originated, provided, and used and is associated with other elements 502-510, 514-522. CPT record 512 resides in file records. CPT record 512 may also include a parent identification which may be used when there is a nesting of trace records and may contain the identification of the parent record.

CPT metric 504 is located at file metrics. CPT metric 504 represents metrics having a set of (name=value) pairs giving additional information about a call. For example, CPT metric can describe a method call parameters, or in case of a database call, some database related values may be provided. These properties can be parsed by the visualizer to a provider specific plug-in or merely can be used as a more detailed description of the record 512. Trace data structure 100 further includes correlators, such as CPT record correlator 510 that resides at file record correlator, CPT correlator 516 that resides at file origins, and CPT correlator definition 518 that resides at file metadata. These correlators 510, 516, 518 provide a value that defines and provides to which measurement or trace the record 512 belongs. For each measurement, a separate correlator 510, 512, 512 may be defined.

Figure 6:
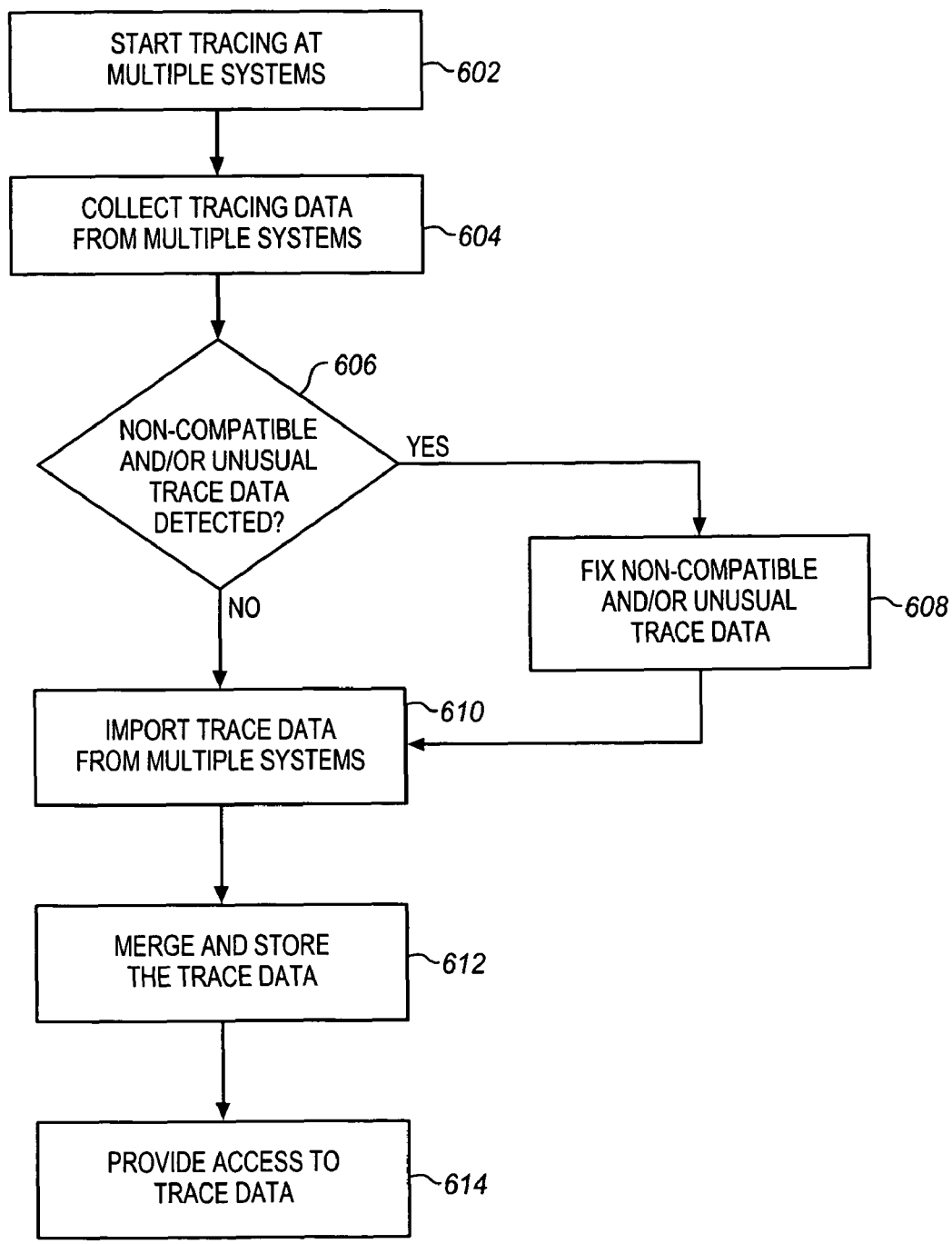
FIG. 6 illustrates an embodiment of a process for tracing at multiple systems and providing access to trace data.

FIG. 6 illustrates an embodiment of a process for tracing at multiple systems and providing access to trace data. In one embodiment, at processing block 602, tracing at multiple systems (e.g., J2EE system, ABAP system, etc.) is started. Tracing can be started by having a Web administration application (e.g., Web Dynpro application) run as triggered by a user via a client via a UI. Once tracing has started, tracing data from various monitored systems is collected at processing block 604. At decision block 606, whether any unusual or non-compatible trace data is being collected is determined. If there is such trace data (e.g., trace data that is not CPT compatible, flawed data, etc.), that trace data is fixed at processing block 608. Examples of the fixing of such trace data includes deleting any flawed data, stopping the tracing at one or more systems, converting the trace data that is not compatible with CPT into trace that is compatible with CPT, etc.

Once the non-compatible or unusual data is fixed or if not such trace data is found, the trace data collected is then imported from multiple systems at a database that is central to a central administration system that is compatible with CPT at processing block 610. As it is discussed elsewhere in this document, compatible trace data may be imported directed so the database via a CPT API, while the importing of other trace data (e.g., non-compatible data) may include the use of additional modules and components, such as an import module, a trace data conversion module, etc. Such trace data is then merged and stored at the database at processing block 612. At processing block 614, access to the trace data stored at the database is provided to the user via the client and the UI.

Figure 7:
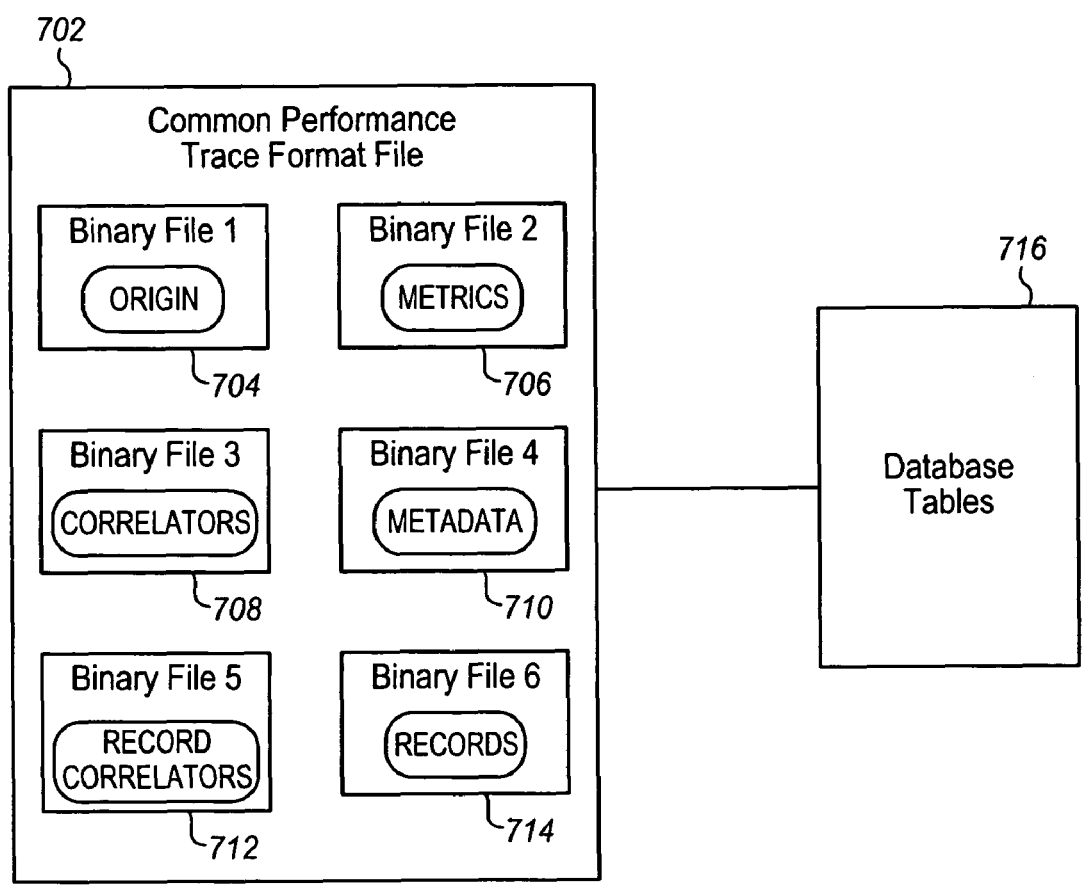
FIG. 7 illustrates an embodiment of a common performance trace format file.

FIG. 7 illustrates an embodiment of a common performance trace format file 700. In one embodiment, common performance trace format is generated and provided by replacing or combining various trace formats. CPT format is provided via CPT format file 702 that is common information model (CIM)-compliant such that any normal tracing can still be performed without a negative impact on the system even in production environments. Having a common trace format helps cover any number and types of tracing scenarios and allows common central storage of trace data and provides a common mechanism for persistence, management, and analysis of the trace data. Further, having a CPT format for performance traces defines the type of trace data that is needed to provide to analyze various performance and functional problems, allows for common central storage of all trace data, and provides correlation of various components.

In one embodiment, CPT trace file 702 includes trace entities or files or file streams 704-714 to be CIM-compliant and CPT format-compatible. These entities or files 704-714 include origins, metrics, correlators, metadata, record correlator, and records that are obtained from a CPT schema and stored in separate binary file 704-714. Each binary file 704-714 represents a trace entity from a CPT schema and is associated with a database table from database tables 716. Each binary file 704-714 includes first bytes to denote the file version, and further includes columns with fixed length of the basic Java types (e.g., short, integer, long, float, double, etc.). String columns of binary files 704-714 have fixed length, while long strings are stored in additional text files that accompany the main entity file (which is binary).

Figure 8:
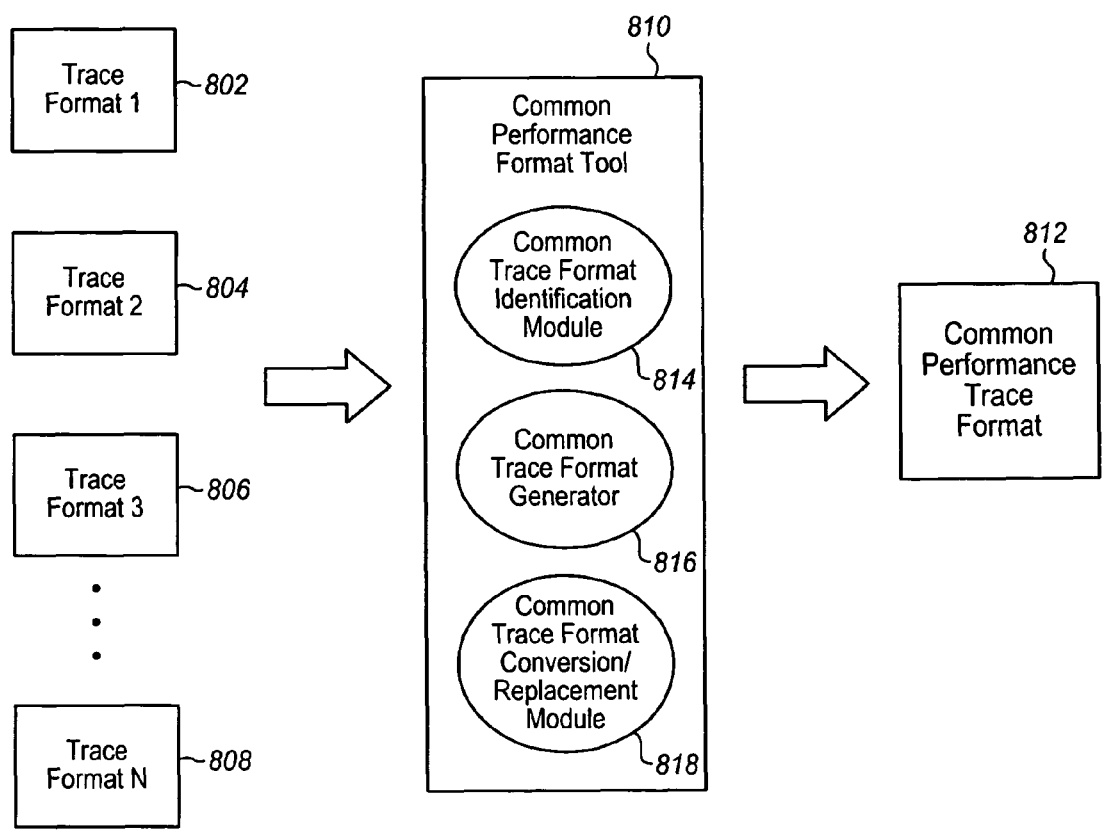
FIG. 8 illustrates an embodiment of a common performance format tool.

FIG. 8 illustrates an embodiment of a common performance format tool 810. Trace data is provided in various formats 802-808 via various trace format files. In one embodiment, CPT tool 810 is employed having various modules, components and entities, such as common trace format identification module (identification module) 814, common trace format generator (generator) 816, and common trace format conversion/replacement module (conversion/replacement module) 818. In one embodiment, different trace formats 802-808 are identified by identification module 814. Generator 816 generates a common trace format, such as common performance trace format 812, by obtaining common elements of each of the trace formats 802-808 and then converting any non-CPT format into CPT format 812 by adding new CPT elements to the existing elements using conversion/replacement module 818. Similarly, conversion/replacement module 818 in communication with generator 816 may entirely replace a non-CPT format by CPT format 812. For example, various trace entities or files, such as origins, metrics, correlators, metadata, record correlator, and records, are provided in a CPT format file and they are added to a non-CPT format file to convert or replace it into a CPT format file.

Figure 9:
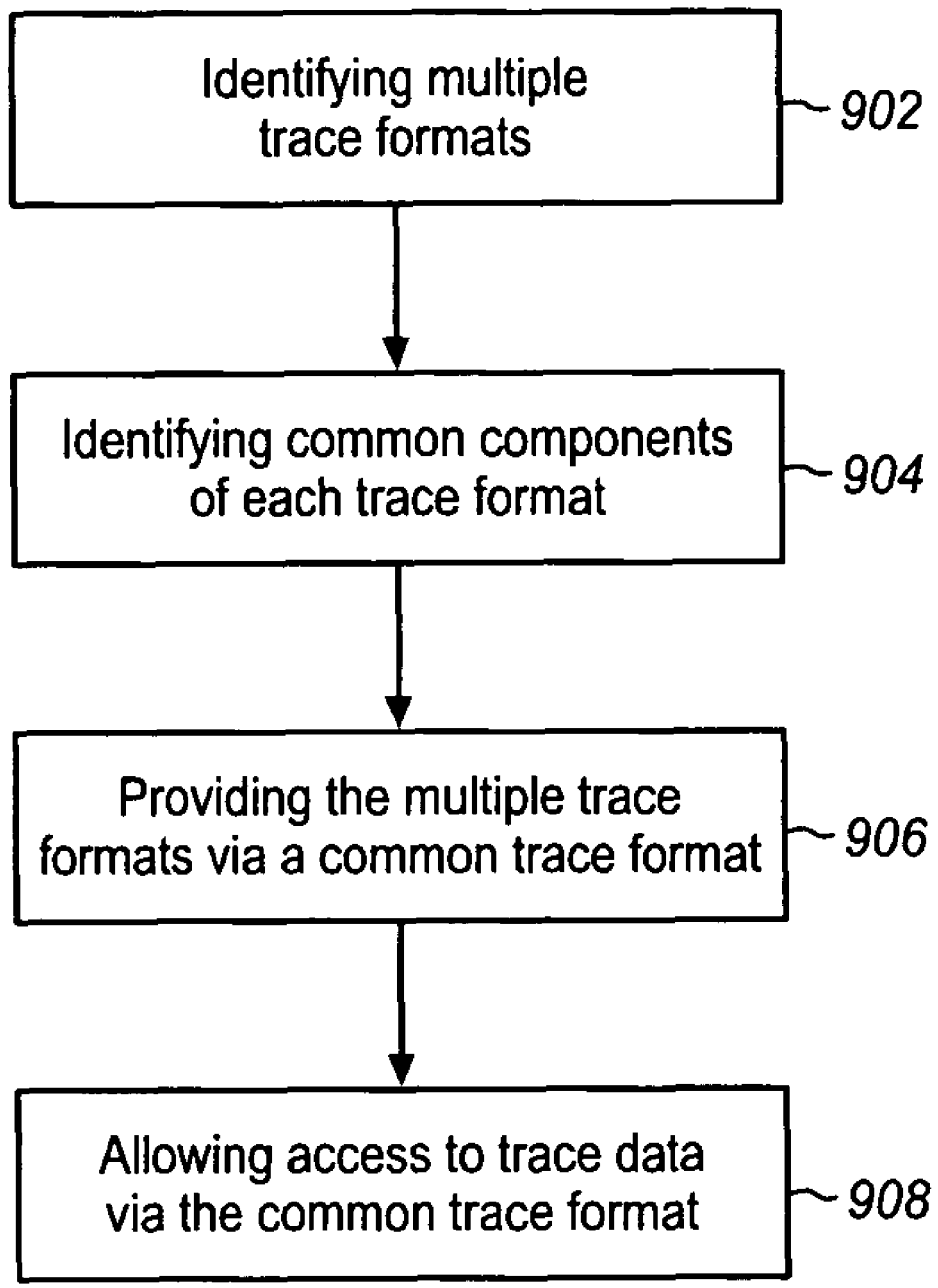
FIG. 9 illustrates an embodiment of a process for generating a common performance trace format.

FIG. 9 illustrates an embodiment of a process for generating a common performance trace format. In one embodiment, at processing block 902, multiple trace formats are identified. At processing block 904, common components, elements, and/or entities from each of the multiple trace formats as provided via corresponding trace format files. At processing block 906, a common performance trace format is generated and provided by adopting CPT-compatible format and converting or replacing any CPT formats into the CPT format. For example, various trace entities or files, such as origins, metrics, correlators, metadata, record correlator, and records, are provided in a CPT format file and they are added to a non-CPT format file to convert or replace it into a CPT format file. At processing block 908, user access to trace data is provided via the CPT format such that the trace data can be easily accessed and analyzed via a common format regardless of the source or provider of the trace data.

Figure 10A:
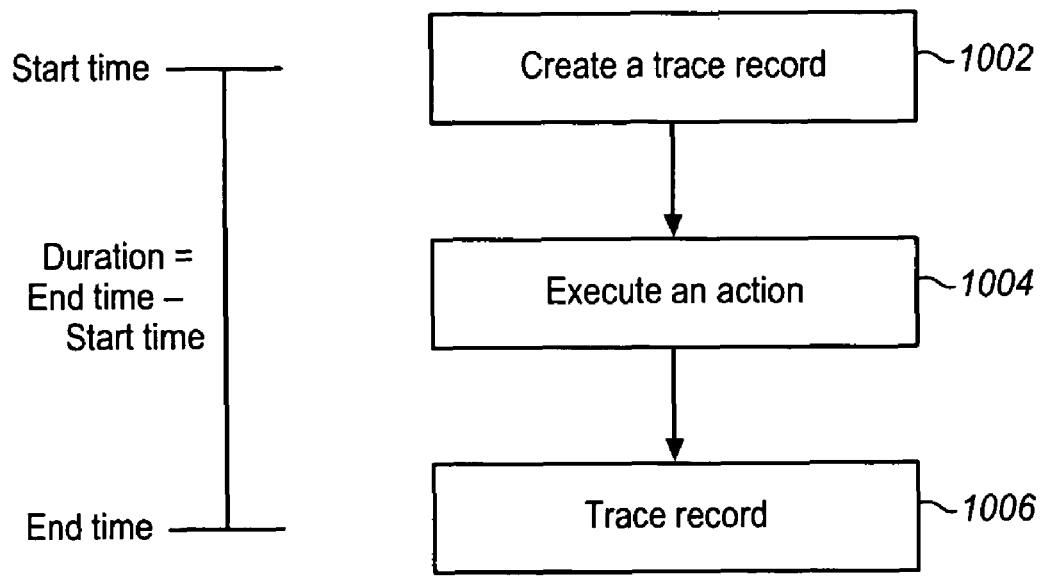
FIGS. 10A-D illustrate embodiments of common trace format-compatible trace record formats.

FIGS. 10A-D illustrate embodiments of common trace format-compatible trace record formats. Referring to FIG. 10A, a trace record is created by a provider (e.g., monitored system) at start time at processing block 1002. An action is executed at processing block 1004. With the execution of the action, tracing is triggered and the record is traced at end time at processing block 1006. The time between the start time and end time referred to as the duration time (e.g., duration time=end time−start time) which allows for additional analysis for the user who can determine the conditions at start time, end time and duration time.

Figure 10B:
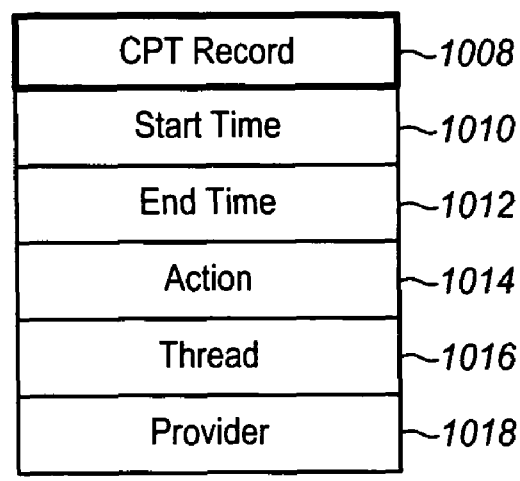

FIG. 10B illustrates an embodiment of a CPT record 1108 and its elements or entities. In one embodiment, such entities include start time 1010, end time 1012, action 1014, thread 1016, and provider 1018. Action 1014 refers to the execution of action that triggers the tracing process, while thread 1016 indicates the process in which the action 1044 was executed. Provider 1018 refers to the monitored system or source that triggered the process of tracing by triggering the action 1014 in thread (process) 1016.

Figure 10C:
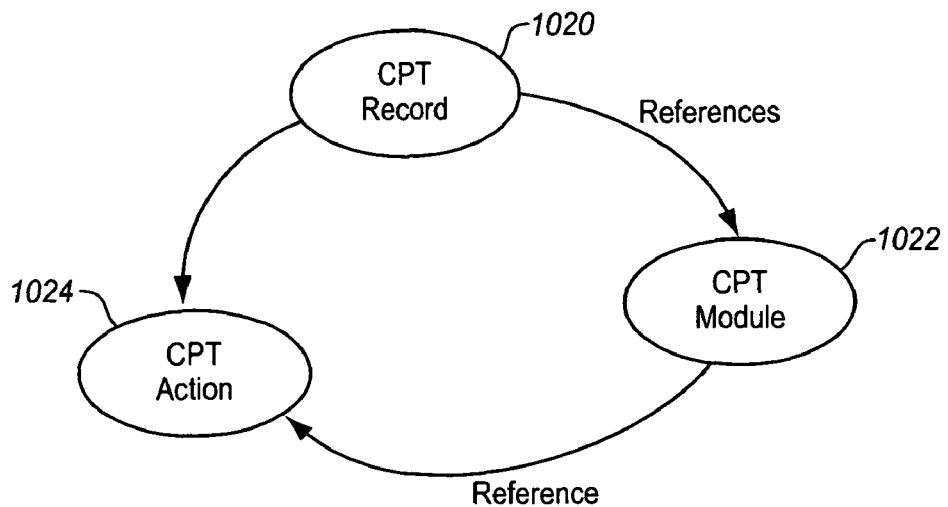
Figure 10D:
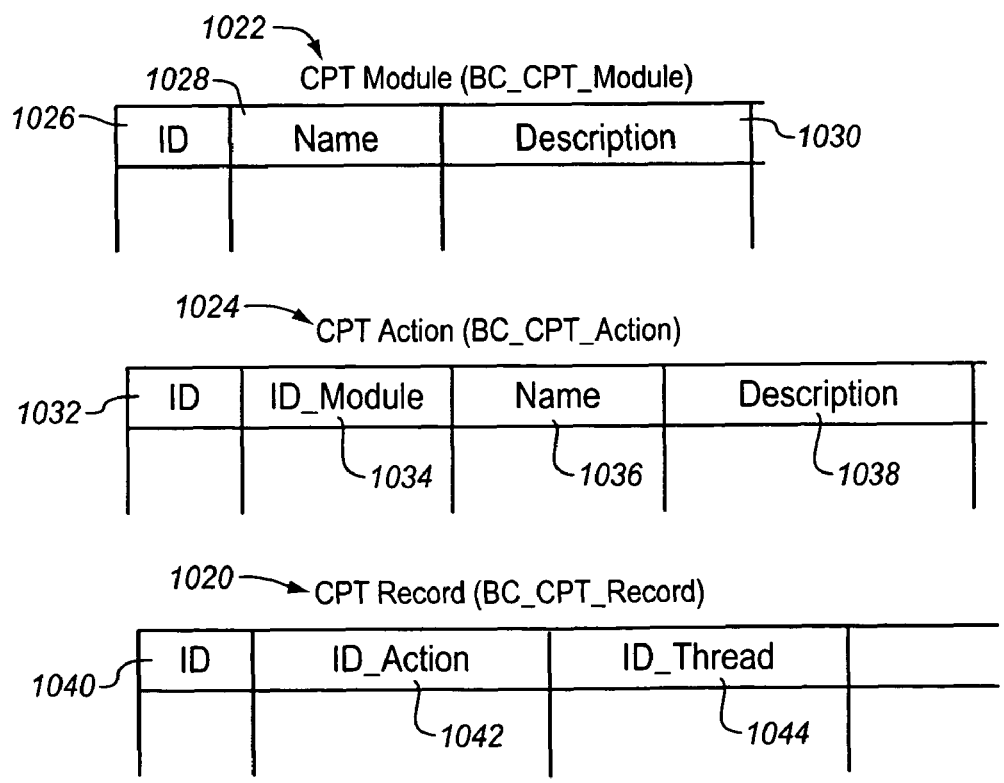

FIG. 10C provides an embodiment of a relationship between CPT record 1020, CPT module 1022, and CPT action 1024. In one embodiment, CPT record 1020 references CPT action 1024, while CPT action 1024 references CPT module 1022. Referring now to FIG. 10D, it provides an embodiment of a file format for each of CPT module 1022, CPT action 1024, and CPT record 1020. In one embodiment, a file format for CPT module 1022 (e.g., BC_CPT_Module) may include references to identification (ID) 1026 (e.g., size equals 4 bytes), name 1028 (e.g., size equals 100 bytes), and description 1030. (e.g., size equals 600 bytes). Similarly, a file format for CPT action 1024 (e.g., BC_CPT_Action) includes ID 1032, module identification (ID_Module) 1034, name 1036, and description 1038, while a file format for CPT record 1020 (e.g., BC_CPT_Record) includes ID 1040, action identification (ID_Action) 1042, and thread identification (ID_Thread) 1044.

FIGS. 11A-D illustrate embodiments of trace data formats. FIG. 11A illustrates and embodiment of various traces 1102-1114 and their corresponding CPT fields 1116-1132 and how they are calculated and extracted. In the illustrated embodiment, "*" indicates the field data is provided by an importer (e.g., host+SID), "p" indicates the field data is provided by an importer (e.g., convector from trace).

FIG. 11B illustrates a metric format having various fields, such as name 1134, values 1136, and description 1138. In one embodiment, name 1134 includes name 1140, data type 1142, semantic type 1144, and value 1146. Name 1140 may be a string in value 1136 and refer to a unique name of the metric. Data type 1142 may be an integer in value 1136 and refer to a value of the metric. In one embodiment, a type value may be a combination of value type 1146 and semantics type 1144 of a record. Value type 1146 can be one of long, double, and string, etc. Value type 1146 represents and actual value of the metric. Semantic type 1144 may depend on the meaning of the metric as well as the way in which it is used by various software components when generating performance trace data. Semantic type 1144 refers to a value that defines the kind of aggregation operation that can be applied on the metric. To comply with the Application Response Measurement (ARM) standard, the following metric semantics 1148 may be defined: counter 1156, gauge 1158, duration 1160, numeric ID 1162, and string 1164 as shown in FIG. 11C along with their corresponding type 1150, example 1152, and aggregates 1154.

In one embodiment, counter 1156 is used when it is necessary to sum-up the values for the metric over a specified interval of time or for a specific correlator value. Counters 1156 use long or double value types. Gauge 1158 is used when there is no need to sum-up the values for the metric over a specified interval of time or for a specific correlator value. Gauges 1158 are used when averages, minimum and maximum values are necessary. Gauges 1158 use long or double value types. Numeric ID 1162 is used to represent a value for which no aggregate is necessary. Numeric IDs 1162 use long or double value types. Duration 1160 is used to represent a time interval. Duration values include counters 1156 and gauges 1158 at the same time. Also, a sum of the values of the sub records can be subtracted from a duration value of duration 1160. Durations use long value type. String 1164 is used to represent a time interval. Duration values are regarded as counters 1156 and gauges 1158 at the same time. Also, a sum of the values of the sub records can be subtracted from a duration value. Durations 1160 use long value type. A net aggregate is applicable in the context of nested records (e.g., Java methods call tree) and represents a value of the metric minus the sum of the metric values for the nested records.

FIG. 11D illustrates an embodiment of a correlation format. Name 1166, values 1168, and description 1170 of type 1172, flags 1174, and value 1176 are provided. Type 1172 refers to a type (e.g., DSR passport, measurement, etc.) that is associated with each correlator. Some correlator types 1172 are served by the ARM specification. Flags 1174 include a set of flags (e.g., trace flags) that are attached to the corresponding correlator. Value 1176 includes a unique type array value, representing the correlator. A byte array contains additional information relating to a specific correlator type.

In one embodiment, a correlator object is mapped to one or more CPT records, defining a correlation between these records. There may not be any restrictions on the number of correlators that are attached to a particular CPT record. Nevertheless, the following three correlators may be planned: (1) DSR passport, (2) manual measurement; and (3) external trace. A DSR passport includes the same validity as a passport. A manual measurement is valid from a manual switch on to a manual switch off. An external trace is dynamically switched on via a carrier protocol or HTTP URL/Header-parameters and is valid during the request duration.

A framework may be used to provide general metrics to trace data, which are either present in the currently existing types of traces or are intended to provide correlations between various trace records. This framework may be used to define a number of metrics that are valid for all types of traces. These metrics include: (1) elapsed time, which includes a long metric, and represents the duration of the execution (e.g., in microseconds) of the corresponding action; (2) CPU time, which includes a long metric, represents the consumed CPU time (e.g., in milliseconds) for the execution of the corresponding action; (3) allocated memory, which includes a long metric, represents the allocated memory (e.g., eligible and not eligible for garbage collection) during the execution of the corresponding action; and (4) transferred (input/output) I/O, which includes a long metric, represents transferred I/O in bytes (e.g., disk, network, etc.) during the execution of the corresponding action.

In addition to the metrics, the framework may also provide the necessary correlator objects. Each record may be associated with one main correlator (e.g., a parent correlator that is assigned to various record correlators). This correlator represents a measurement. Such correlator object may be created each time a new trace is started. In addition to the main correlator, the framework may also provide the following J2EE engine specific values as correlators.: (1) a user, referring to a user executing the corresponding action; (2) an application, referring to an application executing the corresponding action; (3) a session, referring to a security session executing the corresponding action; and (4) a DSR transaction, representing a DSR passport globally unique identifier (GUID) that is used to correlate trace records to DSR data in, for example, ST03G.

In one embodiment, a CPT API is used to automatically fill some of the CPT record fields with default or fixed values. These values include: (1) a record ID that is automatically generated by the CPT API. This value is not supplied by the code which uses the CPT API; (2) an origin includes a CPT origin and is represented by each virtual machine. This object may be created by the framework and contains information about the J2EE engine server node. In a standalone case, there may be a default value for this record field. In all other the cases, the origin may not be set by the code, which uses the API; (3) a thread, by default, the value of which is set to the thread which creates the corresponding CPT record object. The field can be changed by supplying the name of the desired thread; (4) a start timestamp, by default, is set to the timestamp of the CPT record object creation, which can be changed; and (5) a layer, representing a default layer to which the records for a particular provider, by default, are assigned if there is provider ahs a default layer.

Figure 12:
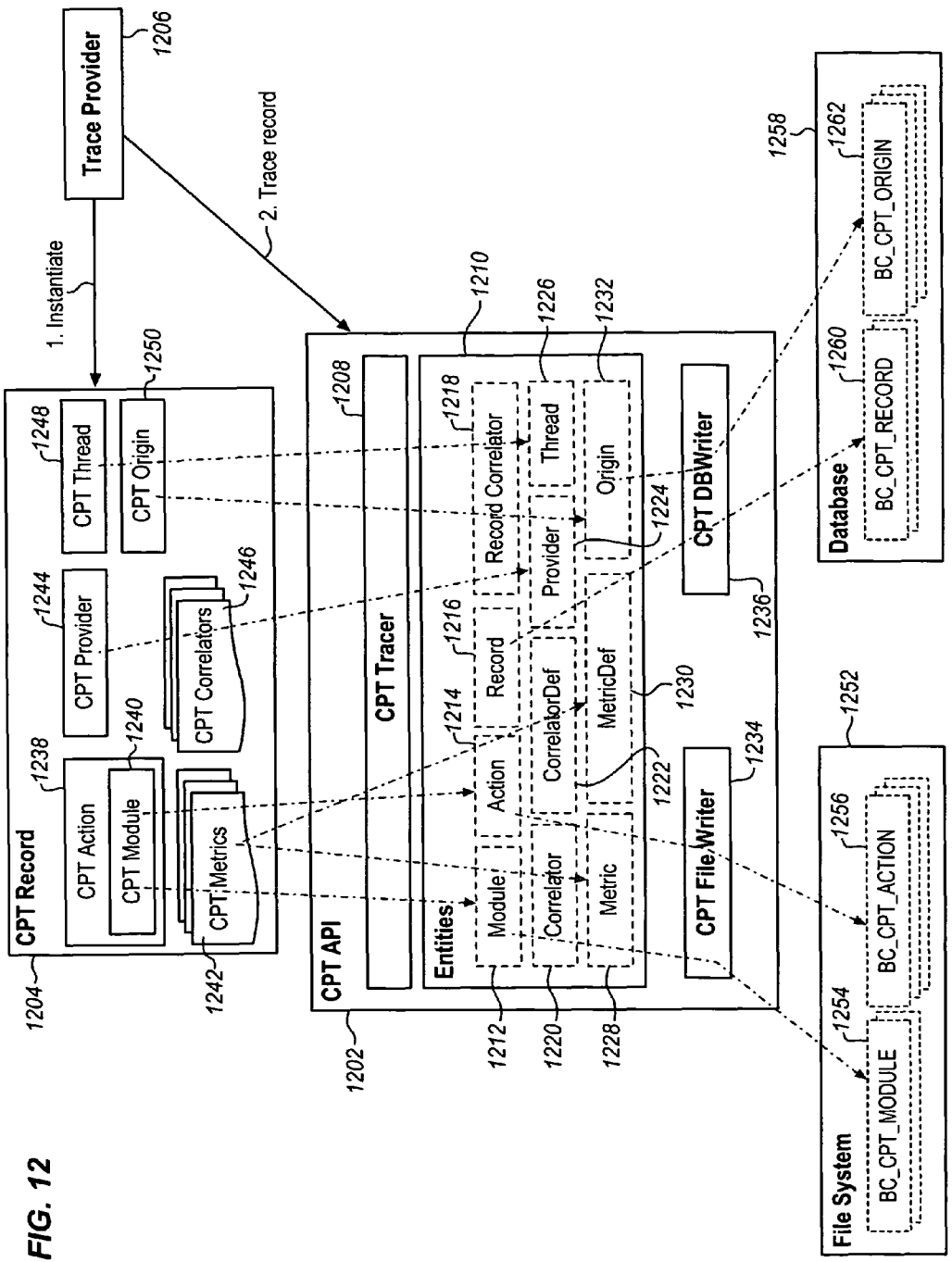
FIG. 12 illustrates an embodiment of a common performance trace application programming interface and record.

FIG. 12 illustrates an embodiment of a common performance trace application programming interface 1202 and record 1204. In one embodiment, CPT API 1202 contains CPT tracer 1208 and entities 1210 that include module 1212, action 1214, record 1212, record correlator 1218, correlator 1220, correlator definition 1222, provider 1224, thread 1226, metric 1228, metric definition 1230, and origin 1232. CPT API 1202 further includes CPT file writer 1234 and CPT database writer 1236. CPT API is in communication with CPT record 1204 that includes CPT action 1238 having CPT module 1240, CPT provider 1244, CPT thread 1248, CPT origin 1250, CPT metrics 1242, and CPT correlators 1246. CPT API is further in communication with file system 1252 and database 1258. File system includes CPT module 1254 and CPT action 1256. Database includes CPT record 1260 and CPT origin 1262.

In one embodiment, trace provider 1206 refers to a component that performs tracing and initiates CPT record 1204 from CPT API 1202. Trace provider 1206 uses the metrics necessary and, when appropriate, invokes the actual trace of CPT records 1204. In a CPT code, CPT record 1204 is passed to CPT tracer 1208 that decouples the record object and invokes insertion of the record metadata and metrics into the corresponding logical entities 1210. Entities 1210 use the configured CPT write 1236 to persist the data into a specific physical storage format, such as database 1258. File writer 1234 may use files at file system 1252 with a described CPT format.

In one embodiment, CPT trace file format includes two main sections: (1) header; and (2) content. A header may describe the version of the file and the amount of columns and their names, while column types may not be described in the file. For example, a header and column name may appear as follows:

| Header | |
|---|---|
| u4 | Version |
| u4 | columns_length |
| column_name[columns_length] | Columns |

| Column name | |
|---|---|
| u30 (UTF string inside) | space for column name |

A column name is a UTF string that has a variable length, but it is not more then 30 bytes in size. The bytes that are not used (e.g., if the name is shorter then 30 bytes) have a value of zero.

Content, in one embodiment, depends on the column type which is not written into the file, but is known from the reader/writer application. CPT files may have fixed format. Example of supported column types are as follows:

| | |
|---|---|
| u4 | Integer |
| u8 | Long |
| u8 | Double |
| char_array[max_length] | String |
| byte_array[max_length] | Bytes |
| u8 | Offset |

| char_array[max_length] | |
|---|---|
| u2 | string_length |
| u(max_length * 8) | string_content_space |

The actual string may be located in the string_content_length bytes, while the string_length determines the end of the string. The characters from string_length to max_length may have a value of zero. An example of a byte array is as follows:

| byte_array[max_length] | |
|---|---|
| u2 | byte_array_length |
| u(max_length) | byte_array_content_space |

The actual byte array may be located in the byte_array_content_space bytes, while the byte_array_length determines the end of the byte array. The bytes from byte_array_length to max_length may have a value of zero.

An offset represents an offset (e.g., in bytes) in the Long Strings File that is used for variable length long string values. This file is in addition to the main CPT file (it may have the same name as the main file with the suffix "str") and contains UTF strings that are written/read in accordance with the DataOutput/DataInput Specification.

An example of a format of different CPT files is as follows:

| ID_ALLOC | s32|i|i |
|---|---|
| BC_CPT_METRIC_DEF | i|i|i|i|s100|o |
| BC_CPT_LAYER | i|s100|o |
| BC_CPT_MODULE | i|s100|o |

| ID_ALLOC | s32|i|i |
|---|---|
| BC_CPT_ACTION | i|i|s100|o |
| BC_CPT_THREAD | i|s100|o |
| BC_CPT_ORIGIN | i|s100|o |
| BC_CPT_PROVIDER | i|s100|o |
| BC_CPT_CORR_DEF | i|s100|o |
| BC_CPT_METRIC | i|i|i|l|d|o |
| BC_CPT_CORRELATOR | i|i|i|b512 |
| BC_CPT_RECORD | i|i|i|i|l|l|i |

Following is a legend explaining various characters of the above-referenced format:

u<n> - Unsigned bytes (n - amount of bytes)
| - separator
i - Integer
s<n> - Fixed length string (with "n" characters)
o - offset (in the "long string" file)
l - long
d - double
b<n> - Byte array (with "n" elements)

In one embodiment, to perform various embodiments of the present invention, a server or node (e.g., J2EE server) is employed, which supports Enterprise Java Bean ("EJB") components and EJB containers (at the business layer) and Servlets and Java Server Pages ("JSP") (at the presentation layer). A virtual machine (VM), including a Java virtual machine (JVM), may be employed to host the server or server node. It is understood that processes taught by the discussion above can be practiced within various software environments such as, for example, object-oriented and non-object-oriented programming environments, Java based environments (such as a J2EE environment or environments defined by other releases of the Java standard), other environments (e.g., a NET environment, a Windows/NT environment each provided by Microsoft Corporation), and the like.

Processes taught by the discussion above may be performed with program code, such as machine-executable instructions, which can cause a machine (such as a "virtual machine", a general-purpose processor disposed on a semiconductor chip, a special-purpose processor disposed on a semiconductor chip, etc.) to perform certain functions. Alternatively, these functions may be performed by specific hardware components that contain hardwired logic for performing the functions, or by any combination of programmed computer components and custom hardware components.

One or more modules within or associated with an enhanced configuration architecture (such as common performance trace architecture 100 of FIG. 1) and its sub-architectures and systems (e.g., central administration system 104), APIs (e.g., CPT API), and its modules, models, components, and other elements may include hardware, software, and a combination thereof. In a case where a module includes software, the software data, instructions, and/or configuration may be provided via an article of manufacture by a machine/electronic device/hardware. An article of manufacture may include a machine accessible/readable medium having content to provide instructions, data, etc. The content may result in an electronic device, for example, a filer, a disk, or a disk controller as described herein, performing various operations or executions described. A machine accessible medium includes any mechanism that provides (i.e., stores and/or transmits) information/content in a form accessible by a machine (e.g., computing device, electronic device, electronic system/subsystem, etc.). For example, a machine accessible medium includes recordable/non-recordable media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.), etc. The machine accessible medium may further include an electronic device having code loaded on a storage that may be executed when the electronic device is in operation. Thus, delivering an electronic device with such code may be understood as providing the article of manufacture with such content described above. Furthermore, storing code on a database or other memory location and offering the code for download over a communication medium via a propagated signal may be understood as providing the article of manufacture with such content described above. The code may also be downloaded from a remote computer (e.g., a server) to a requesting computer (e.g., a client) by way of data signals embodied in a propagation medium (e.g., via a communication link (e.g., a network connection)).

Figure 13:
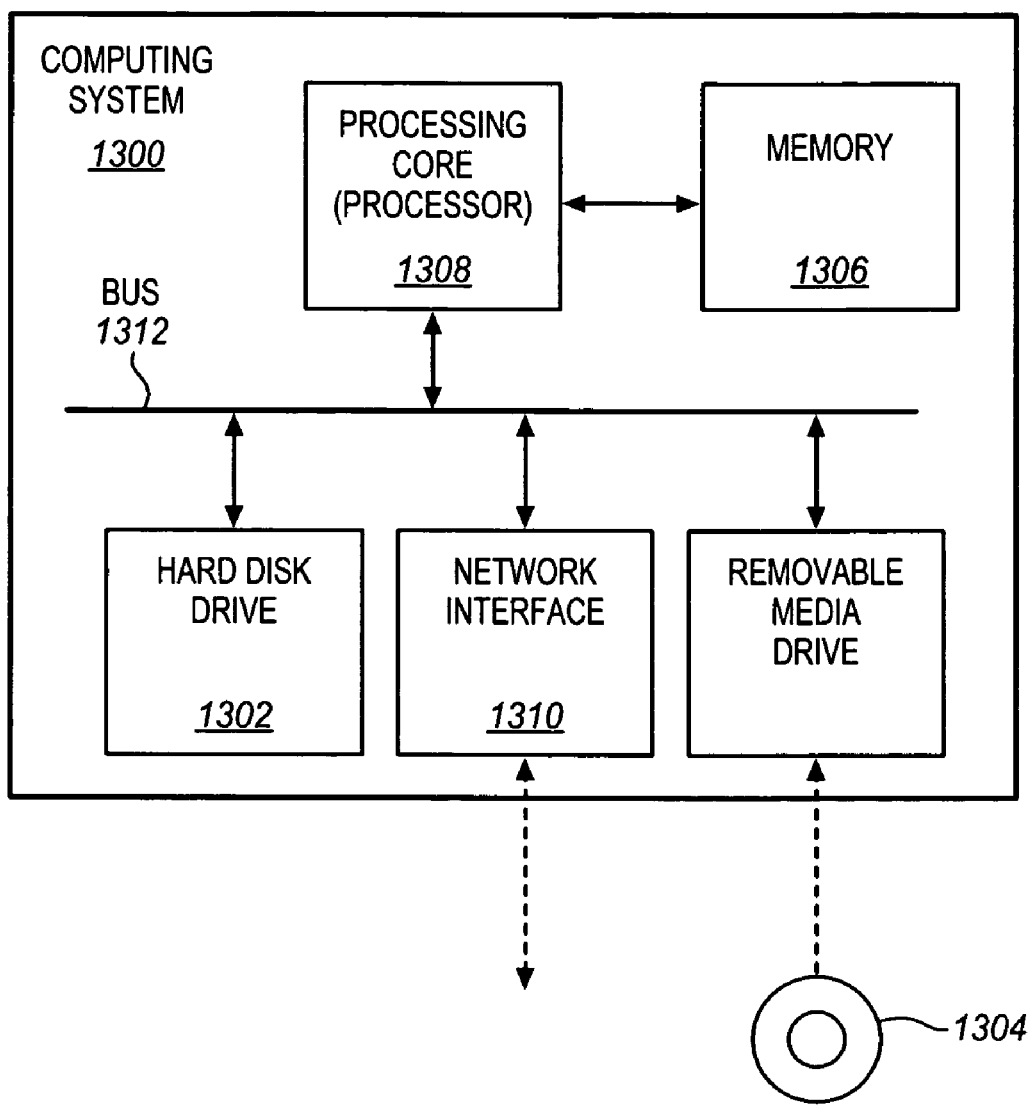
FIG. 13 illustrates a computing system.

FIG. 13 illustrates a computing system 1300. Computing system 1300 may be used for implementing one or more embodiments of the present invention and for executing program code stored by an article of manufacture. It is important to recognize that the computing system 1300 represents merely of various computing system architectures that can be used for the same purposes. The applicable article of manufacture may include one or more fixed components (such as hard disk drive 1302 or memory 1306) and/or various movable components, such as compact disk (CD) ROM 1304, a compact disc, a magnetic tape, and the like. To execute the program code, typically instructions of the program code are loaded into RAM 1306. Then, processing core 1308 executes the instructions. A processing core may include one or more processors and a memory controller function. A virtual machine or "interpreter" (e.g., a JVM) may run on top of the processing core (architecturally speaking) to convert abstract code (e.g., Java bytecode) into instructions that are understandable to the specific processor(s) of processing core 1308. Computing system 1300 further includes network interface 1310 and bus 1312 to connect to other systems via a network and to have various components communicate with each other, respectively.

Figure 14:
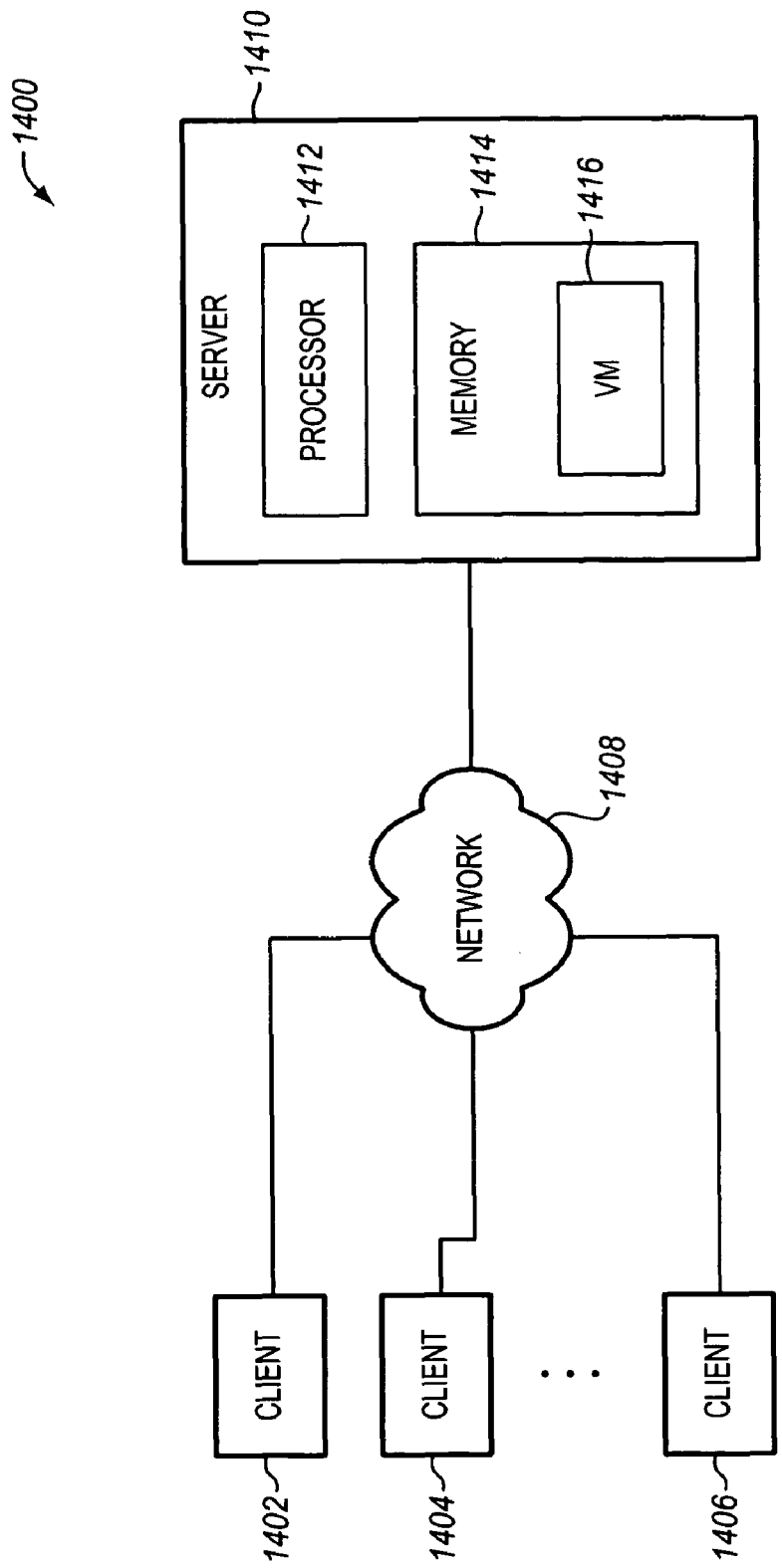
FIG. 14 illustrates a client/server network system.

FIG. 14 illustrates a client/server network system 1400. As illustrated, network 1408 links server 1410 with client systems 1402-1406. Server 1410 includes programming data processing system suitable for implementing apparatus, programs, and/or methods in accordance with one or more embodiments of the present invention. Server 1410 includes processor 1412 and memory 1414. Server 1410 provides a core operating environment for one or more runtime systems (e.g., VM 1416) at memory 1414 to process user requests. Memory 1414 may include a shared memory area that is accessible by multiple operating system processes executing in server 1410. For example, VM 1416 may include an enterprise server (e.g., a J2EE-compatible server or node, Web Application Server developed by SAP AG, WebSphere Application Server developed by IBM Corp. of Armonk, N.Y., and the like). Memory 1414 can be used to store an operating system, a Transmission Control Protocol/Internet Protocol (TCP/IP) stack for communicating over network 1408, and machine executable instructions executed by processor 1412. In some embodiments, server 1410 may include multiple processors, each of which can be used to execute machine executable instructions.

Client systems 1402-1406 may execute multiple application or application interfaces. Each instance or application or application interface may constitute a user session. Each user session may generate one or more requests to be processed by server 1410. The requests may include instructions or code to be executed on a runtime system, such as VM 1416, on server 1410 and its components and modules as described throughout this document.

In addition to what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method comprising:
identifying a first trace format of a first trace data received from a first trace data provider and associated with a first programming engine that is associated with first trace activities at a first computer system, wherein the first trace format is compatible with a common trace data format, wherein identifying the first trace format includes detecting first correlation objects assigned by the first programming engine to first trace entities associated with the first trace activities to determine whether one or more of the first trace entities are compatible or incompatible with the common trace data format;
identifying a second trace format of a second trace data received from a second trace data provider and associated with a second programming engine that is associated with second trace activities at a second computer system, wherein the second trace format is incompatible with the common trace data format, wherein identifying the second trace format includes detecting second correlation objects assigned by the second programming engine to second trace entities associated with the second trace activities to determine whether one or more of the second trace entities are compatible or incompatible with the common trace data format, wherein the second trace data and the second programming engine are incompatible with and independent of the first trace data and the first programming engine, respectively, wherein the common trace data format comprises a trace format that is designated as the common trace data format, the trace format including a common performance trace (CPT) format, wherein the (CPT) format includes a common interface model (CIM)-compliant format and provides the common trace data format defining a type of data that is needed to analyze performance; and
modifying the second trace data by converting the second trace format to the common trace data format, wherein modifying includes converting one or more incompatible second trace entities of the second trace format into one or more compatible common trace entities, removing one or more incompatible second trace entities, or adding one or more compatible common trace entities to the second trace entities.

2. The method of claim 1, further comprising importing, via an import module, the second trace data having the incompatible second trace format from the second trace data provider into a file system for temporary storage prior to the modification.

3. The method of claim 1, further comprising transporting the modified second trace data having the converted second trace format to a database having the first trace data.

4. The method of claim 1, wherein the common trace data format comprises a trace data format that is designated as the common trace data format, the trace data format including a common performance trace (CPT) format.

5. The method of claim 1, wherein modifying further comprises preserving one or more compatible second trace entities of the second trace format.

6. The method of claim 1, wherein the first and second trace entities comprise one or more of an origin file, a metric file, a correlator file, a metadata file, a record correlator file, and a record file.

7. The method of claim 1, wherein the first programming engine comprises a Java 2 Enterprise Edition (J2EE) engine, and the second programming engine comprises an Advanced Business Application Programming (ABAP) engine.

8. A system comprising:
a computer system having a processor coupled with a storage medium and a database, the computer system having an application server employing a trace manager to:
identify a first trace format of a first trace data received from a first trace data provider and associated with a first programming engine that is associated with first trace activities at a first computer system, wherein the first trace format is compatible with a common trace data format, wherein identifying the first trace format includes detecting first correlation objects assigned by the first programming engine to first trace entities associated with the first trace activities to determine whether one or more of the first trace entities are compatible or incompatible with the common trace data format;
identify a second trace format of a second trace data received from a second trace data provider and associated with a second programming engine that is associated with second trace activities at a second computer system, wherein the second trace format is incompatible with the common trace data format, wherein identifying the second trace format includes detecting second correlation objects assigned by the second programming engine to second trace entities associated with the second trace activities to determine whether one or more of the second trace entities are compatible or incompatible with the common trace data format, wherein the second trace data and the second programming engine are incompatible with and independent of the first trace data and the first programming engine, respectively, wherein the common trace data format comprises a trace format that is designated as the common trace data format, the trace format including a common performance trace (CPT) format, wherein the (CPT) format includes a common interface model (CIM)-compliant format and provides the common trace data format defining a type of data that is needed to analyze performance; and
modify the second trace data by converting the second trace format to the common trace data format, wherein modifying includes converting one or more incompatible second trace entities of the second trace format into one or more compatible common trace entities, removing one or more incompatible second trace entities, or adding one or more compatible common trace entities to the second trace entities.

9. The system of claim 8, wherein the trace manager further comprises an import module to import, from the second trace provider, the second trace data having the incompatible second trace format into a file system for temporary storage prior to the modification.

10. The system of claim 9, wherein the trace module is further to transport the modified trace data having the converted second trace format to a database having the first trace data.

11. The system of claim 8, wherein the common trace data format comprise comprises a trace data format that is designated as the common trace data format, the trace data format including a common performance trace (CPT).

12. The system of claim 8, wherein the first programming engine comprises a Java 2 Enterprise Edition (J2EE) engine, and wherein the second programming engine comprises an Advanced Business Application Programming (ABAP) engine.

13. The system of claim 8, wherein modifying further comprises preserving one or more compatible second trace entities of the second format.

14. The system of claim 8, wherein the first and second trace entities comprise one or more of an origin file, a metric file, a correlator file, a metadata file, a record correlator file, and a record file.

15. An article of manufacture comprising a machine-accessible medium having instructions which, when executed, cause a machine to:
identify a first trace format of a first trace data received from a first trace data provider and associated with a first programming engine that is associated with first trace activities at a first computer system, wherein the first trace format is compatible with a common trace data format, wherein identifying the first trace format includes detecting first correlation objects assigned by the first programming engine to first trace entities associated with the first trace activities to determine whether one or more of the first trace entities are compatible or incompatible with the common trace data format;
identify a second trace format of a second trace data received from a second trace data provider and associated with a second programming engine that is associated with second trace activities at a second computer system, wherein the second trace format is incompatible with the common trace data format, wherein identifying the second trace format includes detecting second correlation objects assigned by the second programming engine to second trace entities associated with the second trace activities to determine whether one or more of the second trace entities are compatible or incompatible with the common trace data format, wherein the second trace data and the second programming engine are incompatible with and independent of the first trace data and the first programming engine, respectively, wherein the common trace data format comprises a trace format that is designated as the common trace data format, the trace format including a common performance trace (CPT) format, wherein the (CPT) format includes a common interface model (CIM)-compliant format and provides the common trace data format defining a type of data that is needed to analyze performance; and
modify the second trace data by converting the second trace format to the common trace data format, wherein modifying includes converting one or more incompatible second trace entities of the second trace format into one or more compatible common trace entities, removing one or more incompatible second trace entities, or adding one or more compatible common trace entities to the second trace entities.

16. The article of manufacture of claim 15, wherein the instructions which, when executed, further cause the machine to import, via an import module, the second trace data having the incompatible second trace format from the second trace data provider into a file system for temporary storage prior to the modification.

17. The article of manufacture of claim 15, wherein the instructions which, when executed, further cause the machine to transport the modified second trace data having the converted second trace format to a database having the first trace data.

18. The article of manufacture of claim 15, wherein modifying further comprises preserving one or more compatible second trace entities of the second trace format.

19. The article of manufacture of claim 15, wherein the first and second trace entities comprise one or more of an origin file, a metric file, a correlator file, a metadata file, a record correlator file, and a record file.

20. The article of manufacture of claim 15, wherein the first programming engine comprises a Java 2 Enterprise Edition (J2EE) engine, and the second programming engine comprises an Advanced Business Application Programming (ABAP) engine.

* * * * *